US011019592B2

(12) United States Patent
Win et al.

(10) Patent No.: US 11,019,592 B2
(45) Date of Patent: May 25, 2021

(54) BASE STATION ORDERING FOR LOCALIZATION

(71) Applicants: Massachusetts Institute of Technology, Cambridge, MA (US); King Abdullah University of Science and Technology, Thuwal (SA)

(72) Inventors: Moe Z. Win, Framingham, MA (US); Hesham Eisawy, Makkah Province (SA); Wenhan Dai, Cambridge, MA (US); Mohamed-Slim Alouini, Makkah Province (SA)

(73) Assignees: Massachusetts Institute of Technology, Cambridge, MA (US); King Abdullah University of Science and Technology, Thuwal (SA)

( * ) Notice: Subject to any disclaimer, the term of this patent is extended or adjusted under 35 U.S.C. 154(b) by 0 days.

(21) Appl. No.: 16/145,907

(22) Filed: Sep. 28, 2018

(65) Prior Publication Data

US 2019/0141662 A1 May 9, 2019

Related U.S. Application Data

(60) Provisional application No. 62/564,385, filed on Sep. 28, 2017.

(51) Int. Cl.
*H04W 64/00* (2009.01)
*H04B 17/318* (2015.01)
(Continued)

(52) U.S. Cl.
CPC ........... *H04W 64/003* (2013.01); *G01S 11/06* (2013.01); *H04B 17/318* (2015.01);
(Continued)

(58) Field of Classification Search
CPC .................................................. H04W 64/003
See application file for complete search history.

(56) References Cited

U.S. PATENT DOCUMENTS 9,949,230 B1    4/2018  Meredith et al.
2002/0038201 A1*  3/2002  Balaven ............... G01V 99/005
                                                           703/2

(Continued)

FOREIGN PATENT DOCUMENTS

WO    WO2016/079656    11/2015

OTHER PUBLICATIONS

Cellular Coverage Map as a Voronoi Diagram Journal of communication and information systems vol. 23 No. 1 2008 Apr. 2, 2008 Jose Portela and Marcelo Alencar (Year: 2008).*

(Continued)

*Primary Examiner* — Kevin M Cunningham
(74) *Attorney, Agent, or Firm* — Occhiuti & Rohlicek LLP

(57) ABSTRACT

An approach to localizing a mobile device takes advantage of the device reporting the order of its neighboring base stations (BSs) according to the received power of the pilot signals. Based on the received BS order, the agent is located within the intersection of corresponding higher-order Voronoi cells. Assuming that the BSs are deployed according to a Poisson point process (PPP) and that signals are subject to log-normal shadowing, the tradeoff between the ALR and the localization error probability can be characterized. It is shown that increasing the number of reported BSs generally reduces the ALR and improves the localization accuracy at the expense of increasing the localization error.

24 Claims, 13 Drawing Sheets

(51) Int. Cl.
*H04W 76/50* (2018.01)
*H04W 36/00* (2009.01)
*G01S 11/06* (2006.01)
*H04L 5/00* (2006.01)
*H04L 12/24* (2006.01)
*H04W 4/02* (2018.01)

(52) U.S. Cl.
CPC .......... *H04L 5/0048* (2013.01); *H04L 41/048* (2013.01); *H04W 4/025* (2013.01); *H04W 36/00835* (2018.08); *H04W 64/00* (2013.01); *H04W 76/50* (2018.02)

(56) References Cited

U.S. PATENT DOCUMENTS

| | | | | |
|---|---|---|---|---|
| 2007/0083789 | A1* | 4/2007 | Jung | H04L 67/125 714/1 |
| 2011/0188398 | A1* | 8/2011 | Baba | H04B 7/15542 370/252 |
| 2014/0035782 | A1* | 2/2014 | Fischer | G01S 19/06 342/357.43 |
| 2014/0235266 | A1* | 8/2014 | Edge | G01S 5/02 455/456.1 |
| 2014/0274109 | A1* | 9/2014 | Venkatraman | G01S 5/0278 455/456.1 |
| 2015/0148025 | A1* | 5/2015 | Wei | H04W 16/08 455/418 |
| 2017/0026850 | A1* | 1/2017 | Smith | H04W 4/025 |
| 2017/0134899 | A1* | 5/2017 | Chan | H04W 64/00 |
| 2017/0280413 | A1* | 9/2017 | Zhang | G01S 5/0236 |

OTHER PUBLICATIONS

Aurenhammer et al. "A simple on-line randomized incremental algorithm for computing higher order Voronoi diagrams," *International Journal of Computational Geometry & Applications*, (1992).

Franz Aurenhammer "Voronoi Diagrams—a survey of a fundamental geometric data structure," *ACM Computing Surveys*; vol. 23, No. 3 (1991).

Hoff et al., "Fast computation of generalized Voronoi diagrams using graphics hardware," University of North Carolina at Chapel Hill; www.cs.unc.edu/~geom/voronoi/ retrieved from Internet Dec. 13, 2018.

Der-Tsai Lee, "On κ-nearest neighbor Voronoi diagrams in the plane," *IEEE Transactions on Computers*, vol. C31, No. 6 (1982).

Wang et al., "A novel range free localization scheme based on Voronoi diagrams in wireless sensor networks." *Journal of Computer Research and Development*; 45:1 (2008); http://crad.ict.ac.cn/EN/abstract/abstract200.shtmll, retrieved from Internet Dec. 13, 2018.

Han et al., "Localization algorithms of Wireless Sensor Networks: a survey," *Telecommunication Systems—Springer Verlag*; vol. 52, No. 4 2419-2436 (2013).

* cited by examiner

BASE STATION ORDERING FOR LOCALIZATION

CROSS-REFERENCE TO RELATED APPLICATIONS

This application claims the benefit of U.S. Provisional Application No. 62/564,385, filed Sep. 28, 2017, which is incorporated herein by reference.

FEDERAL SPONSORSHIP

This invention was made with government support under Grant No. 70NANB17H177 awarded by the U.S. Department of Commerce. The government has certain rights in the invention.

PRIOR DISCLOSURES BY INVENTOR

Hesham Elsawy, Wenhan Dai, Mohamed-Slim Alouini, and Moe Z. Win. "Base Station Ordering for Emergency Call Localization in Ultra-dense Cellular Networks," *IEEE Access* 6 (Oct. 4, 2017): 301-315.

BACKGROUND

This application relates to localization of a mobile station in a cellular communication network, and more particularly to localization based on base station ordering associated with the mobile station.

In public safety emergencies, delays in response time can lead to unprecedented negative consequences and causalities. Fast, ubiquitous, and accurate localization in emergencies are fundamental pillars to shorten the response time and alleviate life-threatening delays. Given the ubiquity of cellular services along with the fact that over 70% of the emergency calls are placed from mobile phones, integrated localization services within the cellular networks are important to public safety systems. In fact, public safety authorities enforce cellular operators to localize emergency calls within a desirable accuracy, and such accuracy may vary according to the underlying application and technological maturity. For instance, the enhanced 911 (E-911) standard, released by the US Federal Communications Commission (FCC), requires cellular operators to localize 911 callers with an accuracy of 50 meters. Achieving such localization accuracy may also be useful for localized multicasting, which can be used to inform citizens about security threats/hazards at a specific location without disturbing citizens elsewhere. However, the localization accuracy of 50 meters is inadequate to support some mission-critical applications (e.g., search and rescue operations) in cellular networks. In the emerging public safety networks, the rescuers themselves may use the cellular (e.g., LTE) infrastructure for communication, localization, and navigation. Exploiting the foreseen ultra-densification of the next-generation (i.e., 5G and beyond) cellular networks, we can achieve much higher localization accuracy (within the range from a few meters to decimeters) that complies with requirements in public safety scenarios, which will boost the emerging convergence between cellular and public safety networks. In addition to the public safety sector, accurate localization services within 5G networks can be further utilized by several applications within the foreseen Internet-of-Things (IoT), such as autonomous driving, health-monitoring, and automated delivery.

Accurate localization services within cellular networks cannot rely on a stand-alone Global Positioning System (GPS), which is either unreliable or unavailable in indoor and urban high-rise/canyon environments with non-line-of-sight (NLOS) satellite communication. Instead, the ubiquitous cellular and Wi-Fi base stations (BSs) can be utilized to complement GPS for providing localization services. One appealing solution is to implement the range-based localization techniques in terrestrial wireless networks. Particularly, the BSs serve as anchors, i.e., nodes with known positions, whereas mobile terminals serve as agents, i.e., nodes with unknown positions. (Hereafter, the terms BSs and anchors as well as the terms mobile terminals, mobile devices, and agents will be used interchangeably.) Agents can estimate distances from the wireless signals exchanged with the anchors, such as radio signal strength (RSS), time-of-arrival (TOA), time-difference-of-arrival (TDOA), and angle-of-arrival (AOA). Based on the estimated distance information, each agent can run an algorithm (e.g., triangularization) to localize itself with respect to the anchors. However, range-based localization techniques may require specific hardware and/or impose computational burden on devices, which might not be fulfilled in many scenarios. For instance, some cellular devices (e.g., old-generations) may not support accurate ranging techniques. In the context of IoT, some devices may be constrained by energy and computational capabilities to localize themselves. Consequently, range-based localization techniques at the terrestrial BSs may not fulfill the localization ubiquity required by public safety and IoT, which necessitates offloading the localization process to the network side and imposing little burden on agents.

SUMMARY

In a general aspect, a localization technique, embodiments of which are denoted as BS ordering Localization Technique (BoLT), utilizes the intrinsic features of Voronoi tessellations to localize agents, requiring the order of the BSs with respect to the agent along with the knowledge of the BS locations at a central network controller. Different from the range-based techniques, the proposed BoLT does not require distance estimation between an agent and its neighboring BSs. Instead, it only requires the distance order from BSs to the agent, which can be obtained by comparing the received energy from the pilot signals that are periodically transmitted by BSs. This makes the performance of the proposed BoLT robust to signal power fluctuations and shadowing effect as long as the order of the received power is maintained to match the ordered distances to the BSs. It is worth noting that the BS order is intrinsically reported within the neighbor cell list (NCL) that is periodically sent by mobile terminals to their serving BSs, which is required to assist association and handover processes. Consequently, one or more embodiments of BoLT offer ubiquitous and unified localization service irrespective of device types or capabilities, which fulfills network-wide localization objectives in applications, such as public safety and E-911. Any additional ranging features implemented at the agents and/or network sides can only enhance the performance of network-based localization.

In at least some embodiments, BoLT provides a location region (LR) in which the agent lies with a high confidence level, and such an LR is computed by the intersections of "higher order Voronoi cells" (as defined later in this document) that corresponds to the reported BS order. Consequently, the performance of BoLT is assessed via the following two metrics (also refered to as performance measures). The first is the area of the reported LR that likely contains the agent location, denoted as area of location region (ALR). The smaller the ALR, the better the localization accuracy of BoLT. The second is the localization error probability, which is the probability of the agent not being in the reported LR. Localization errors may occur due to shadowing that is strong enough to alter the received pilot power order from the corresponding true BS's distance order. As will be shown later in this document, there is a tradeoff between the ALR and the localization error probability in terms of the number of reported BSs. Incorporating the order of more BSs involves more intersections of the higher order Voronoi cells, which reduces the ALR and improves BoLT accuracy. However, the localization error probability increases with the number of reported BSs due to the increased vulnerability to shadowing-induced false ordering.

In some implementations, in a general network setting, a tradeoff between accuracy and error exists. Stochastic geometry is utilized to obtain the spatially averaged ALR and localization error probability. Particularly, assuming that the BSs are scattered according to a Poisson point process (PPP), which is widely-accepted to model the locations of BSs in large-scale networks, including cellular and Wi-Fi networks in urban environments, an upper bound for the average ALR of the proposed BoLT is obtained. A closed-form approximation for the localization error probability for log-normal shadowing is also obtained. It is shown that the ALR is approximately inverse-linear to the BS intensity. In contrast, the percentage reduction in the ALR via increasing the number of reported anchors is independent from the BS intensity. The number of reported BSs is an adjustable parameter in cellular network via manipulating the NCL size. It is also shown that the localization error probability is irrelevant to the BS intensity. Instead, the localization error depends on the propagation environment and shadowing variance. Results show that the foreseen ultra-densification for 5G cellular networks can enable a localization accuracy of a few meters with six BSs, or even sub-meter with ten BSs, which is sufficient to localize emergency calls, complies with the E-911 requirements, and can save lives in search and rescue operations.

In one aspect, in general, a method for localization of a mobile device in a communication environment comprising a plurality of fixed location base stations includes determining a subset of a number (N) of base stations from the plurality of base stations, representing a determination of the closest N base stations to the mobile device. The determined subset of base stations is used to access a database holding an association of a plurality of subsets with respective location information for the environment, and to retrieve a location information corresponding to the subset of base stations. The retrieved location information is then provided as representing a location of the mobile device.

Aspects may include one or more of the following features.

The location information comprises a representation of a localization region of the environment.

The location region comprises a convex region, for instance, the location region comprises a higher-order Voronoi cell or an intersection of higher-order Voronoi cells.

Data representing a probability of error in localization and/or representing a spatial uncertainty of the location region are provided for the retrieved location region.

The subset of the base stations comprises an ordered subset that is ordered according to determined distance between the mobile device and the corresponding base station (e.g., a tuple of base stations, starting with the closest).

Determining the subset of base stations includes determining a characteristic of communication between the mobile device and base stations of the plurality of base station.

The characteristic of communication is a radio frequency communication characteristic. Alternatively, the communication characteristic is an optical frequency or an acoustic communication characteristic.

The characteristic of communication comprises an indicator of receive signal strength (e.g., RSSI).

The subset of base station represents base stations with the greater RSSI than determined for other base stations of the plurality of base station.

The communication characteristic characterizes propagation time of a signal passing between the mobile device and respective base stations.

The subset of bases station represents base stations with the smaller propagation time than determined for other bases stations of the plurality of base station.

In another aspect, in general, a method for localization of mobile devices in a communication environment comprising a plurality of fixed location base stations includes determining, for each subset of a plurality of subsets of base stations from the plurality of base stations, a corresponding localization region of the environment. The localization region is determined such that for any location in the localization region, each of the base stations of the subset are closer to the location than other base stations of the plurality of base stations not in said subset. A database is stored in which each record associates a subset of base stations with corresponding location information representing the localization region determined for said subset. The database is configured for use in determining location information for a mobile device from a determination of the closest N base stations to the mobile device.

Aspects may include one or more of the following features.

Each subset of the base stations comprises an ordered subset, wherein for any location in the localization region, the base stations are ordered by distance between said location and the location of the base station.

The determining of the localization regions for the environment comprises receiving a characterization of locations of the base stations.

The characterization of the location of the base stations comprises actual locations of said base stations.

The characterization of the location of the base stations comprises a statistical characterization of a spatial distribution of said locations, for instant a parameter value of a stochastic process (e.g., a Poisson point process (PPP)).

The determining of the localization regions for the environment comprises receiving a characterization related to determination of the closest N base stations to a mobile device, for instance, according to distances of the location of the mobile device to locations of the base stations.

The method further comprises selecting the number (N) of base stations used in the assocation of the subsets with corresponding location information according to an anticipated performance measure.

The method further comprises determining an expected performance measure for an ensemble of determinations of location information for mobile devices at locations in the environment.

The expected performance measure comprises a representation of a probability of an actual location of the mobile device being within the determined localization region based on a determined subsets of the base stations by the mobile device at said actual location.

The expected performance measure comprises a measure of the size of the determined localization region, for instance an area of the localization region).

The step of selecting the number (N) of base stations comprises selecting the number according the expected performance measure resulting from use of that number in determining the location information for mobile devices in the environment.

The method further includes repeatedly determining location information for mobile devices in the environment, such that each such step of determining the location information includes determining a subset of a number (N) of base stations from the plurality of base stations representing a determination of the closest N base stations to the mobile device, and using the determined subset of base stations to access the database to retrieve a location information corresponding to the subset of base stations.

The approaches may be used for cellular networks of all types. The proposed BoLT takes advantage of the agent reporting the order of its neighboring BSs according to the received power of the pilot signals. Based on the received BSs order, BoLT localizes the agent within the intersection of the corresponding higher-order Voronoi cells. Assuming that the BSs are deployed according to a PPP and that signals are subject to log-normal shadowing, the tradeoff between the ALR and the localization error probability can be characterized. It is shown that increasing the number of reported BSs reduces the ALR and improves the localization accuracy at the expense of increasing the localization error. It is also shown that the localization error probability is irrelevant to the BS intensity. Instead, the localization error depends on the propagation environment and shadowing variance. Consequently, improving the localization accuracy via increasing the BSs intensity is more favorable than through increasing the number of reported BSs, where the ALR is shown to have an approximate inverse-linear relationship with the intensity of BSs.

Results show that reporting the order of six neighboring BSs is sufficient to confine the average ALR within 10% of the cell area. This would be translated to a few meters in the foreseen ultra-dense 5G networks. Finally, it is shown that the localization accuracy improvement via increasing the number of reported anchors is independent from the BS intensity. Since the proposed BoLT requires the least amount of information (i.e., the BSs order only) to localize the agent, its localization performance can be considered as a universal upper bound for the localization error in all the ranging techniques that may be used in cellular networks. These results provide guidelines for the implementation of low-cost and robust localization algorithms in cellular networks.

DETAILED DESCRIPTION

Acronyms
RSS received signal strength
RSSI received signal strength indicator
BS base station
GPS global positioning system
NLOS non-line-of-sight
BoLT BS ordering Localization Technique
HLR hypothetical location region
WLOG Without loss of generality
ALR area of location region
LR location region
NCL neighbor cell list
IoT Internet-of-Things
PPP Poisson point process
PDF probability density function
CDF cumulative distribution function
NLOS non-line-of-sight
GPS Global Positioning System
Mathematical Notation In general, the description below uses the following conventions. The sans serif font is used for random variables, e.g., v, and the roman font for their instantiation, e.g., v. Vectors are bolded, e.g., v; and sets are uppercase, e.g., Ω and X. The instantiation of a random quantity (variable, vector, or set) is denoted by a dotted equal sign ($\dot{=}$). The functions $f_v(\cdot)$, $F_v(\cdot)$, $\mathbb{E}_v\{\cdot\}$, and $\mathcal{V}_v\{\cdot\}$ denote, respectively, the probability density function (PDF), cumulative distribution function (CDF), expectation, and variance of the random variable v. The overline $\bar{\cdot}$ is used to denote the complement operator and $[\cdot]^+$ is used to denote max$\{\cdot, 0\}$. The Lebeguse measure of a set X is denoted as L (X). The notations $\|\cdot\|$ and $|\cdot|$ are used, respectively, to denote Euclidean norm and absolute value.

1 System Overview

Figure 1:
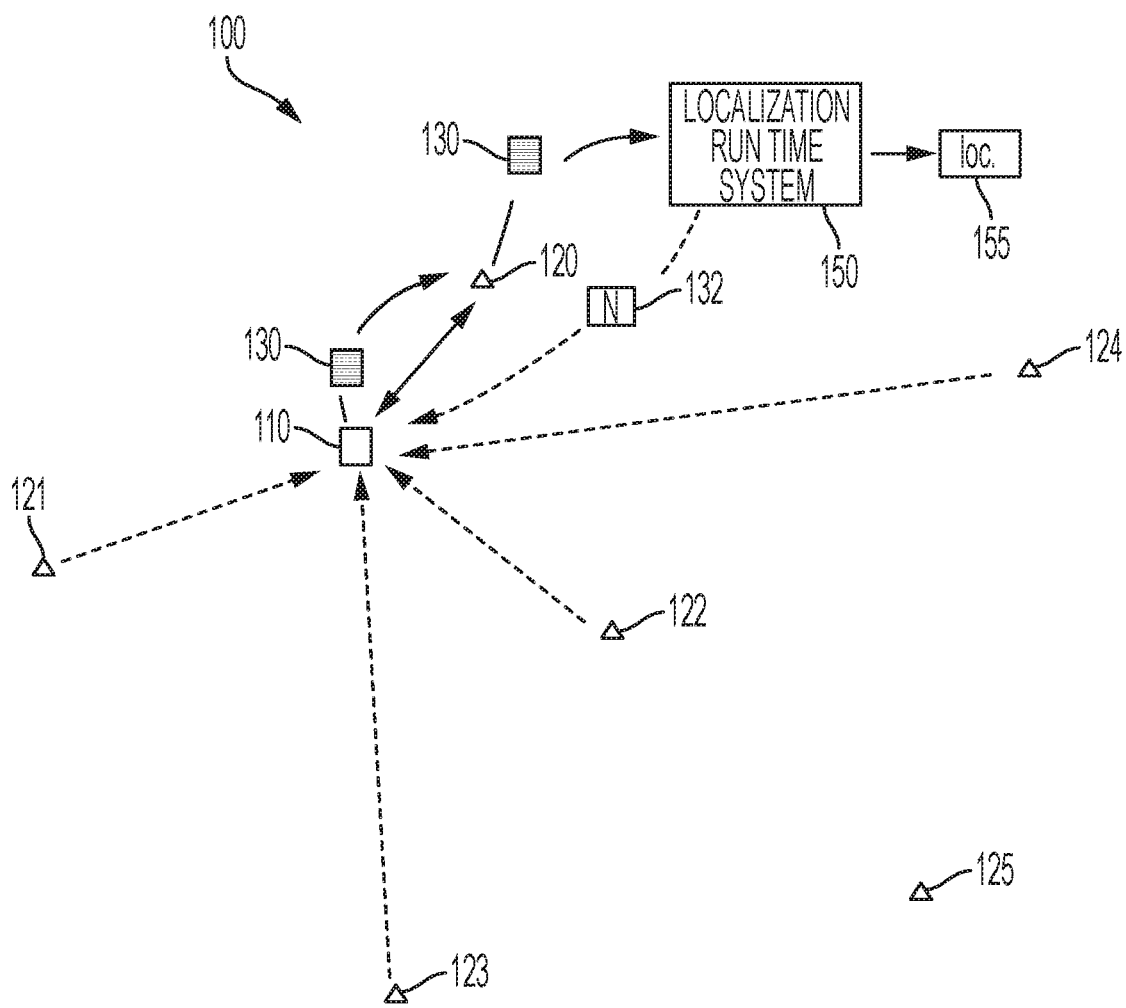
FIG. 1 is a schematic illustration of a communication environment including a representative mobile device and a set of base stations.

Referring to FIG. 1, a communication environment 100 includes a mobile device 110, for instance a cellular telephone, and a number of base stations 120-125 in the environment. Generally, these base stations provide communication services to the mobile device as it moves in the environment, with the mobile device 110 generally primarily communicating with (also referred to as being "served by") one of the base stations, which is typically but not necessarily the closest base station to the mobile device. The mobile device is "handed off" from one base station to another as it moves through the environment.

In the illustrated situation of FIG. 1, the mobile device 110 is being served by base station 120. In addition, the mobile device 110 receives transmissions (e.g., "pilot signals") from other base stations 121-124, while it is out of range of yet other base stations, such as base station 125. The mobile device is able to measure the received signal strength (RSS) of transmissions from each of the base stations in absolute terms (i.e., in units of dBm) and/or can determine the relative strength (e.g., also referred to as received signal strength indicator (RSSI)) of the transmissions from the various base stations from which it receives transmissions. Note that in a cellular system, the pilot signals from the base stations are generally transmitted at a standard power level, and therefore the relative power levels at the base stations represent the relative attenuation of the transmission in propagation from the base stations to the mobile device.

As part of conventional cellular protocols, the mobile device 110 periodically sends RSSI data 130 to its serving base station 120 over a control channel, at least in part to determine whether the mobile device should be handed off to be served by another base station. The RSSI data 130 can be considered to be an ordered list of base stations, often referred to as the cell neighboring list (NCL), with the base station with the highest RSSI being first. If the serving base station is no longer first in the list, the communication system may hand off the mobile device to another base station.

As discussed further below, a simple model of attenuation may predict that the lower the RSSI the farther away a base station is from the mobile device. Therefore, it should be evident that the identity of the base station with the highest RSSI provides information about the location of the mobile device. To the extent that the base station with the highest RSSI is indeed the closest, then the mobile device is in the proximity of the location of that base station, and more particularly is in a convex region referred to as a Voronoi cell around that base station's location. This is the case for homogeneous network setup (i.e., all base stations are all of the same kind). For the case of heterogenous networks (i.e., macro, micros, pico, and femto BS s), and in alternative embodiments, the same procedure can be applied with simple scaling for the powers given the BS type.

The RSSI data 130 provides more information about the location of the mobile device by virtue of the set of base stations listed in the data, and the order of the base stations. In particular, the RSSI data 130 is passed to a localization runtime system 150, which processes the data to determine localization information 155 characterizing the location of the mobile device 110. In this example, the localization information 155 represents a location region (LR) within which the mobile device is expected to be located. In some implementations, the localization information includes or is associated with computed performance measures, which may include a probability that the mobile device is truly in the LR that is provided.

Figure 2:
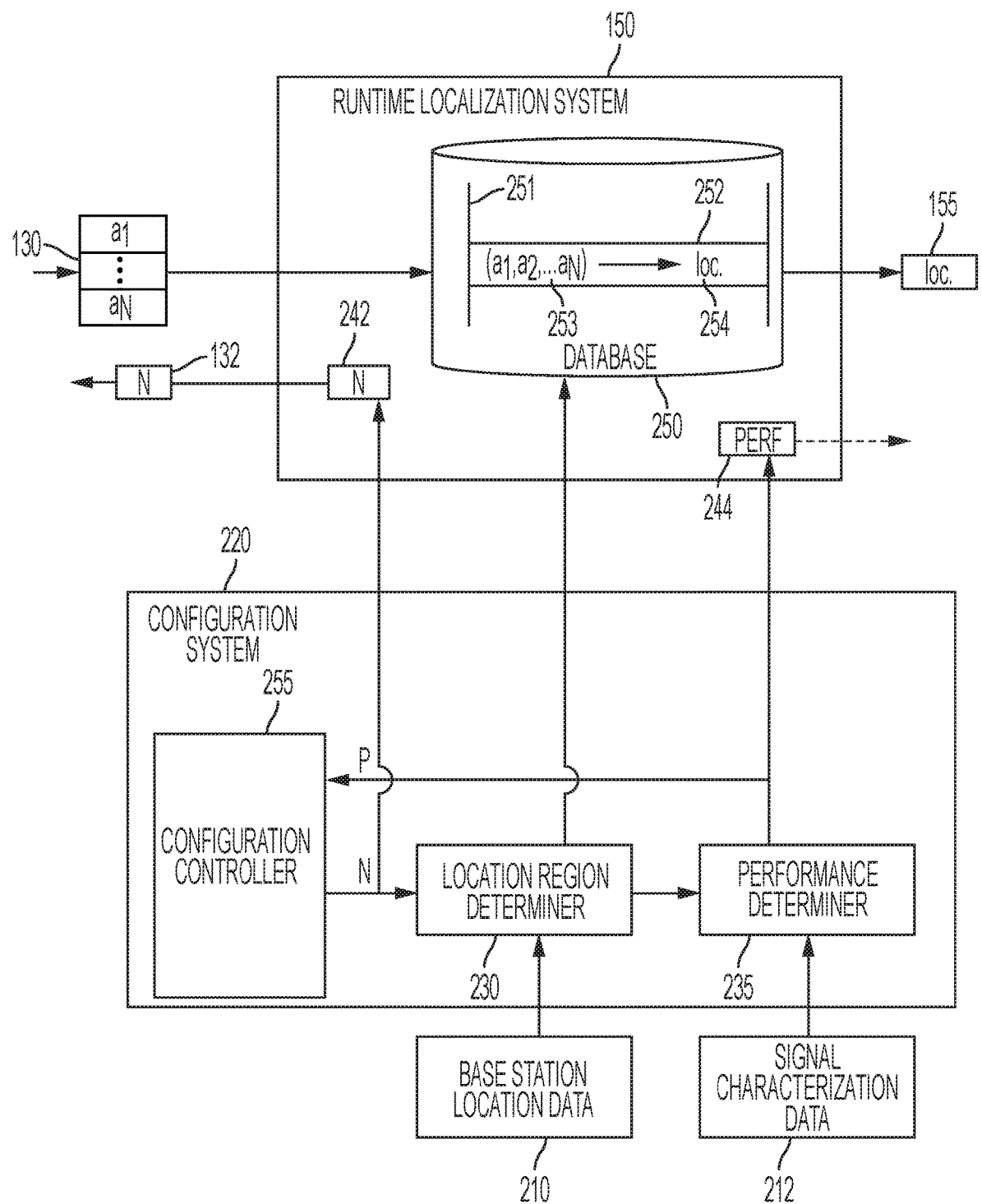
FIG. 2 is a block diagram of a runtime localization system and associated configuration system.

Referring to FIG. 2, the runtime localization system 150 introduced in FIG. 1 is used to process the RSSI data 130 to produce the localization information 150. Internally, the runtime system 150 includes a database 250, or an equivalent data structure and/or procedural system, that accepts the RSSI data 130 and locates a corresponding record 252 in a database table 251. This record 252 provides the association of a specified set of base station identifiers 253, represented as $(a_1, a_2, \ldots, a_N)$, with localization information 254 in table.

As discussed further below, the system maintains a desired number (N) of base stations to include in the set 253 that is used to look up the localization information. In some implementations, this number is provided to the mobile devices so that they include that many or at least that many base stations in the RSSI data 130 that is provided. In some implementations, only that number of base stations are considered in the lookup of the localization information. In some implementations, the runtime system 150 includes a performance measure 244 (e.g., a probability that the true location corresponds to the localization information 155), which may be provided with the localization information 155.

Continuing to refer to FIG. 2, a configuration system 220 determines the data used by the runtime system 150. For example, this data is computed once when the communication system is deployed, and may be updated as changes are made in the system, including when base stations are added or removed, or equivalently are turned on and off. The configuration system 220 makes use of base station location data 210, which includes the geographic locations of the base stations (e.g., the base stations 120-125 in FIG. 1). Generally, for a particular choice of the number (N) of base stations to use for localization, the configuration system 220 includes a location region determiner 230. The location region determiner essentially computes the data required to populate the table 251 (or equivalent data structure) of the runtime system.

In systems in which a performance measure 244 is provided and/or in which the number (N) used for localization is selected (e.g., optimized), the configuration system 220 includes a performance determiner. As introduced above, if the RSS or RSSI information was perfectly monotonic with distance, the order of the base stations would necessarily correspond to the true ordering by distance between the mobile device and the corresponding base stations.

However, in practice, this is not the case and the RSS that is received may be different from that anticipated merely by distance, for example, due to other attenuation effects, such a shadowing when an object obstructs a direct propagation path between the base station and the mobile device. Therefore, the order according to RSSI may not necessarily correspond to the order by distance. Furthermore, these other attenuation effects vary over time and from base stations to base station. In at least some implementations, the configuration system 220 makes use of signal characterization data 212. The signal characterization data 220 may include values of parameters of statistical distributions, for instance following a well-known shadowing model. In particular, the data may include two parameters, a path loss exponent ($\eta$) and a shadowing variance ($\sigma^2$) such that the RSSI (as a logarithm of power) for a propagation distance r varies as $$RSSI = -\eta \log r + s$$

where the shadowing term (s) has a Gaussian (Normal) distribution $$s \sim \mathcal{N}(\mu, \sigma^2)$$

Assuming the shadowing is identically distributed for all base stations, the mean shading ($\mu$) does not affect the ordering.

Generally, or at least conceptually or approximately, the performance determininer 235 considers for all locations in the environment the probability that the true order of base stations matches the determined order based on the signal characterization data (e.g., the shadowing model), and if it does not, the probability that the location region determined by the incorrect order nevertheless includes the actual location. Together, these two factors yeild a probability of correct localization for each location, which when averaged over all locations (e.g., uniformly over the environment) yields an average probability of correct localization that is provided in the performance measure 244.

As discussed further below, in some embodiments the average performance measure may be based on the actual locations of base stations. In other embodiments, the performance measure may be approximate, for example, using a statistical characterization of the locations of the base stations, such as a spatial density ($\lambda$) which is used to approximate the locations of the base stations as a Poisson point process (PPP).

Continuing to refer to FIG. 2, in some embodiments the number of the base stations in the subset is fixed. In other embodiments the number of base stations in the subset is optimized, for example, according to the performance measure of the probability of error in localization and the area of the localization region (e.g., by minimizing an overall cost function, such as a weighted combination of probability of localization error and area of the localization region). In such an embodiment, the configuration system 220 includes an optional configuration controller, which essentially cycles through different values of N (i.e., N=1, 2, 3, . . . ) until the cost function begins to increase. Then the best value of N is used to configure the runtime system 150.

2 Localization Region Computation

As introduced above, the region of the communication environment for which the locations are all closest to the same base station has the form of a Voronoi cell, and all the Voronoi cells for all of the base stations forms a Voronoi tesselation (i.e., partition into cells or tiles) of the environment. For clarity below, we refer to such a Voronoi cell as a "first order" cell, which may be formally defined as follows:

Definition 1 (First-order Voronoi-cell) Let S denote a set of points in $\mathbb{R}^2$ and let x∈S denote a point in the set. The first-order Voronoi-cell of x is defined as the set of points in the plane that are closer to the point x than any other point in $\mathcal{S}$, i.e., $$\mathcal{V}_x = \{y \in \mathbb{R}^2 \mid \|x-y\| < \|z-y\|, \forall z \in S \setminus x\}.$$

As discussed above, knowing the closest base station yields a location region equal to the Voronoi cell of the location of that base station. This procedure can be specified formally in terms of a set S, which contains the locations of all available BSs and x ∈ S is the location that corresponds to the nearest BS to the mobile device. Once the localization system 150 determines that x ∈ S is its nearest BS, the LR is confined within the first-order Voronoi cell in Definition 1.

To further improve the localization accuracy, the agent can report the order of more BS s within the NCL and BoLT can utilize higher-order Voronoi tessellations. The definition of the higher-order Voronoi tessellations is given below.

Definition 2 (Higher-order Voronoi-cell) Let S denote a set of points in $\mathbb{R}^2$ and let X ⊆ $\mathcal{S}$ denote a subset of $\mathcal{S}$ with k elements. The kth-order Voronoi-cell of X is defined as the set of points that are closer to the points in X than any other points in $\mathcal{S}$, i.e., $$\mathcal{V}_X = \{y \in \mathbb{R}^2 \mid \|x-y\| < \|z-y\|, \forall x \in X \text{ and } \forall z \in S \setminus X\}.$$

Computation procedures for first order or higher order Voronoi cells are known, for example, as described in Der-Tsai Lee, "On k-Nearest Neighbor Voronoi Diagrams in the Plane," in *IEEE Transactions on Computers*, vol. C-31, no. 6, pp. 478-487, June 1982. Other computational geometry algorithms, which can be used, are provided in one or more of the following: Okabe, Atsuyuki, Barry Boots, Kokichi Sugihara, and Sung Nok Chiu. *Spatial tessellations: concepts and applications of Voronoi diagrams*. Vol. 501. John Wiley & Sons, 2009; Hoff III, Kenneth E., John Keyser, Ming Lin, Dinesh Manocha, and Tim Culver. "Fast computation of generalized Voronoi diagrams using graphics hardware." *In Proceedings of the 26th annual conference on Computer graphics and interactive techniques*, pp. 277-286. ACM Press/Addison-Wesley Publishing Co., 1999; Aurenhammer, Franz. "Voronoi diagrams: a survey of a fundamental geometric data structure." *ACM Computing Surveys* (CSUR) 23, no. 3 (1991): 345-405; and F. Aurenhammer and O. Schwarzkopf, "A simple on-line randomized incremental algorithm for computing higher order voronoi diagrams," *International Journal of Computational Geometry & Applications*, vol. 2, no. 4, pp. 363-381, 1992.

Referring to FIG. 2, in some embodiments, in which the order of first N the base stations in the RSSI data 130 is ignored, the location region determiner 230 computes the $N^{th}$ order Voronoi cells to populate the database 250 with mappings of unordered sets 253 to the Voronoi cells 254, for instance, represented as "corner" points of the cell or the bounding lines (i.e., linear inequalities in coordinates) of the cell.

Figure 3:
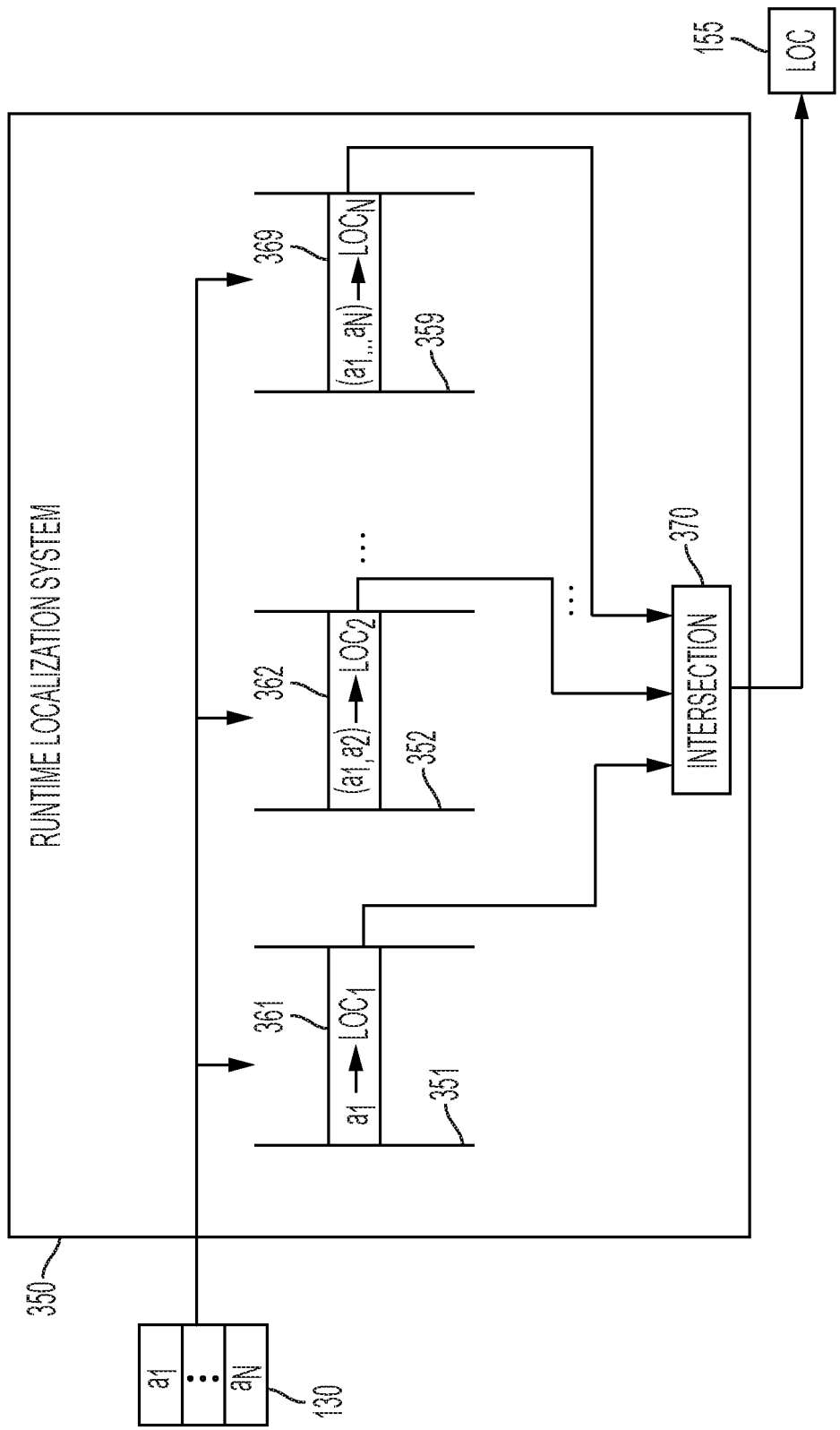
FIG. 3 is a block diagram of an alternative runtime localization system using ordered subsets of base stations.

Preferably, the order of the first N of the base stations in the RSSI data 130 is not ignored, because the order provides additional information regarding the location of the mobile device. The computation of higher-order Voronoi cells, which associate unordered sets of base station locations with location regions, is used for computing the location regions for ordered subsets. Referring to FIG. 3, one such implementation decomposes the task of identifying the location region for an ordered subset of N base stations into determining a first-order Voronoi cell (i.e., k=1 order) for the closest base station, and determining the $k^{th}$ order higher-order Voronoi cell for the unordered subsets made up of the 1<k≤N first base stations in the ordered subset, for each such k. In FIG. 3, an implementation of this approach uses a separate table 351-359 for each k. Given the ordered set of base stations ($a_1, s_2, \ldots, a_N$), the first table 351 is used to look up the record 361 for single base station ($a_1$) and its corresponding location information representing the first-order Voronoi cell. Then, the second table 352 is used to look up the unordered set ($a_1, a_2$) to find the record 362 for the higher-Voronoi cell constrained to correspond to the first two base stations. Finally, the last table 359 is used to look up the entire set ($a_1, \ldots, a_N$) to find the Voronoi cell for that unordered set.

An intersection unit 370 combines the representations of each of the Voronoi cells to produce the order-sensitive location information 155. For example, if each of the Voronoi cells is represented as a set of linear inequalities in the coordinate, then the intersection may be implemented by retaining only those inequalities that are not redundant with the other inequalities (i.e., always satisfied), thereby providing a specification of the location region in terms of the remaining inequalities, or corresponding lines or corner points. In some implementations, the location information 155 is further simplified, for example, with a representative location (e.g., the center of mass) and optionally the area of the region, rather than the specific resulting convex region resulting from the intersections.

It should be recognized that the run-time decomposition shown in FIG. 3 is not required, and the database 250 of FIG. 2 can explicitly include all possible orders of the base stations with the precomputed intersections of the higher-order Voronoi cells.

Figure 4:
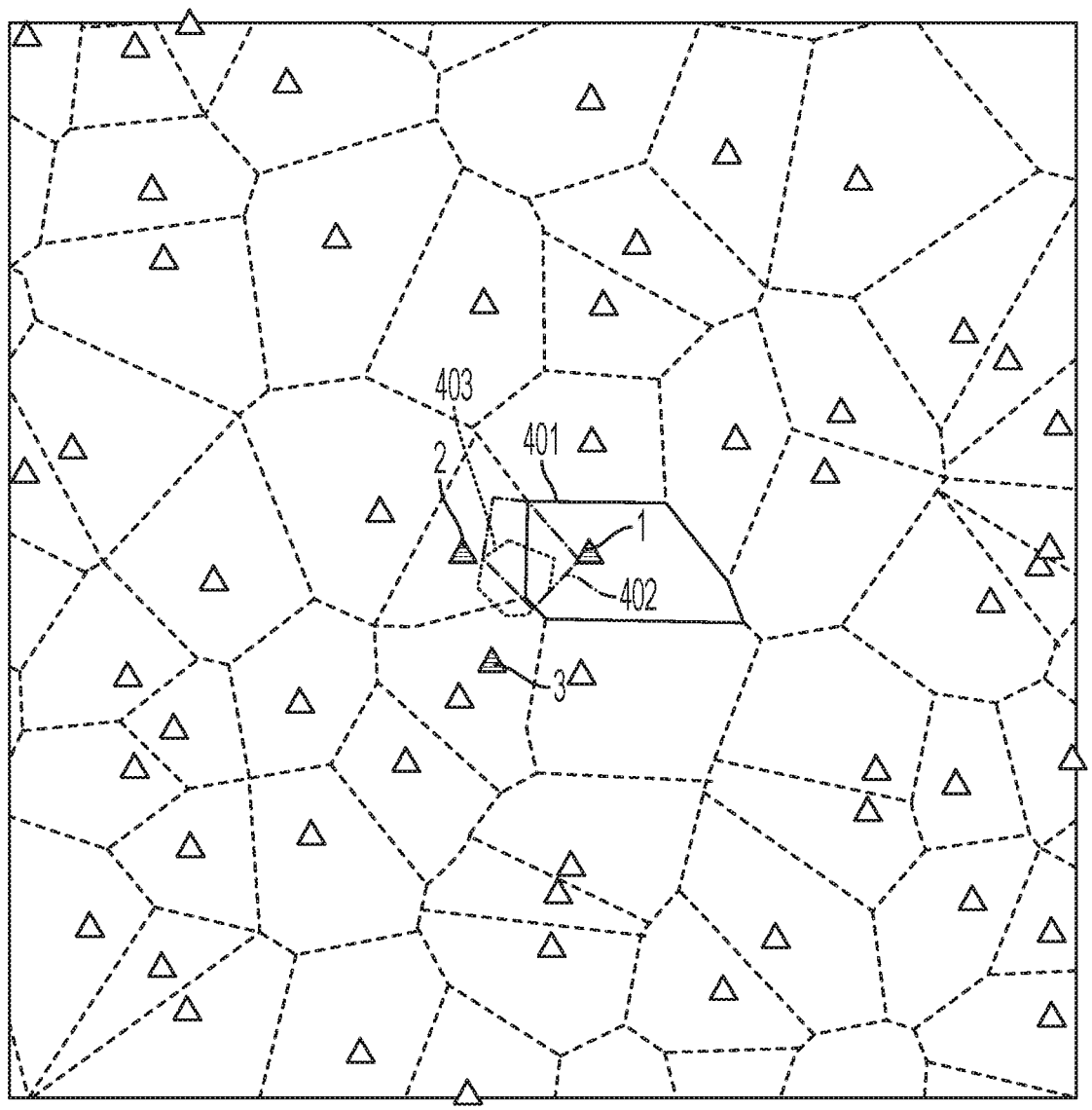
FIG. 4 is a map showing base stations and corresponding first-order Voronoi tesselation, and a first, a second, and a third order Voronoi cell for BS 1, BSs 1 and 2, and BSs 1, 2, and 3, respectively.

Referring to FIG. 4 showing a Voronoi tesselation (in dashed lines) for an environment, an example of a first-order (401, $\mathcal{V}_{x_1}$), second-order (402, $\mathcal{V}_{x_2}$), and third-order (403, $\mathcal{V}_{x_3}$) Voronoi cell, and corresponding LR (filled, $\{\mathcal{V}_{x_1} \cap \mathcal{V}_{x_2} \cap \mathcal{V}_{x_3}\}$) for m=3 anchors is shown, where $x_i$ denotes the location of the ith nearest BS with respect to the agent and $x_m = \{x_1, x_2, \ldots, x_m\}$ denotes the set of ordered locations of the m nearest BSs.

3 Assessment of Localization Performance

In this section, an approach to estimating the performance of the localization approach is presented for a cellular network with BSs that are spatially distributed according to the PPP, $\Psi \in \mathbb{R}^2$ with intensity $\lambda$. The localization is based upon the order of the BSs according to their pilot signal strength. The pilot signals are periodically broadcast from all BSs via omni-directional antennas at a unified power level of P Watts. The signal power decays at the rate $r^{-\eta}$ with the propagation distance r, where $\eta$ is the path-loss exponent. The agents continuously monitor the pilot signals that are periodically sent by the BSs. Each agent orders the BSs within the NCL according to the received power of their pilots. The order of the neighboring BS is then reported back to the serving BS. Since the pilot signal power is averaged over multiple measurements across time, the effect of fast-fading is alleviated and only long-term shadowing effects may disrupt the BSs order. In this analysis, we adopt the widely used log-normal shadowing model, in which the signals from the BSs to the agents are subject to independent and identically distributed shadowing, the log of which follows a Gaussian distribution with mean $\mu$ and variance $\sigma^2$. Such shadowing may lead to false order of the BSs.

Except for the area of the first-order Voronoi-cell, the distribution of which can be accurately approximated via Gamma distribution, there are no known tractable expressions for the distributions or moments of the area of a higher-order Voronoi-cell. Hence, it is not mathematically tractable to quantify the ALR because it involves intersections of Voronoi-cells of different orders. For the sake of tractability, we resort to approximating the LR with HLR. Let $\mathcal{B}(x, r)$ denote the set of points within a disc of radius r centered at x. We next introduce the definition of the first-order HLR.

Definition 3 (First-order HLR) Let $\mathcal{S}$ denote a set of points and let o denote a given origin point. Let $x_1 \in \mathcal{S}$ denote the point closest to o. The first-order HLR is defined as $\mathcal{H}_{x_1} = \mathcal{B}(o, r_1)$, where $r_1 = \|x_1 - o\|$.

Similarly, we can define higher-order HLR as follows.

Definition 4 (Higher-order HLR) Let $\mathcal{S}$ denote a set of points and let o denote a given origin point. Let $X = \{x_1, x_2, \ldots, x_k\} \subseteq \mathcal{S}$ denote a subset of $\mathcal{S}$ with k elements such that $\|x_i - o\| \leq \|x_j - o\|$, $\forall i < j$. The kth-order HLR is defined as $$\mathcal{H}_x = \{y \in \mathcal{B}_{(o, r_1)} | \|x_i - y\| < \|x_j - y\|, \forall 1 \leq i < j \leq k\}.$$

Without loss of generality (WLOG), we translate the network $\Psi$ (i.e., the set of base station locations) such that the agent to be localized is at the origin of the $\mathbb{R}^2$. Due to the translation invariance property of the PPP, such translation has no effect on the spatially average performance of BoLT. We also label the points within $\Psi$ according to their distances from the origin (or equivalently from the agent denoted as o). That is, we label the points so that the following equality holds: $\|x_i\| \leq \|x_j\| \forall i < j$. Since we assume that the agent is located at the origin, the following equality $\|x_j - o\| = \|x_j\|$ hold.) Substituting $\Psi$ into $\mathcal{S}$ in Definition 3, we obtain a first-order HLR. Similarly, substituting $\Psi$ into $\mathcal{S}$ in Definition 4, we obtain higher-order HLRs. In the rest of this discussion, when the LR and the HLR are referred to, we assume that they are associated with $\Psi$ and the origin point is the agent location.

Figure 5:
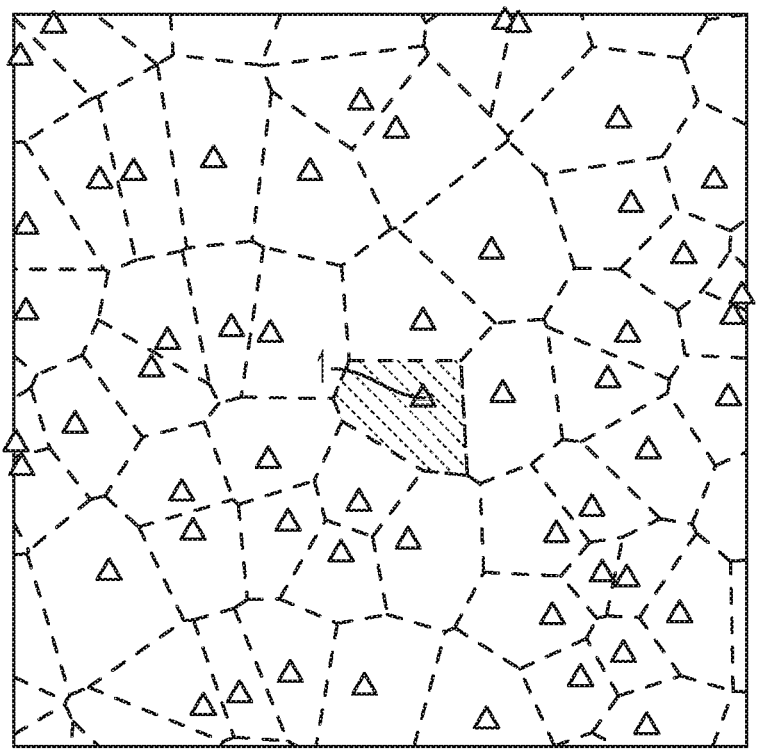
FIG. 5 is a first-order tesselation of an area showing access point locations, and a first order Voronoi cell for one BS.
Figure 6:
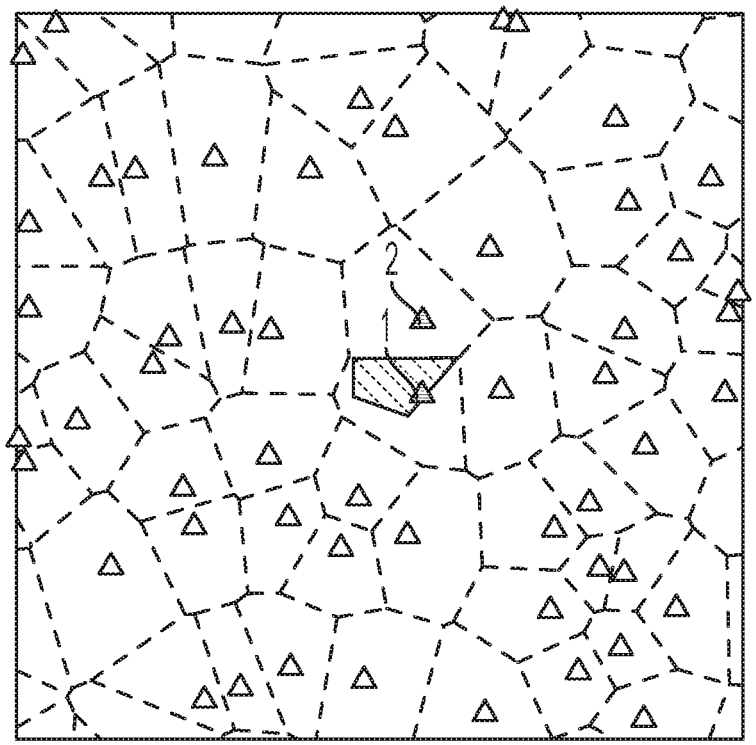
FIG. 6 is a first-order tesselation of an area showing access point locations, and an intersection of a first-order and a second-order Voronoi cell for two BSs.
Figure 7:
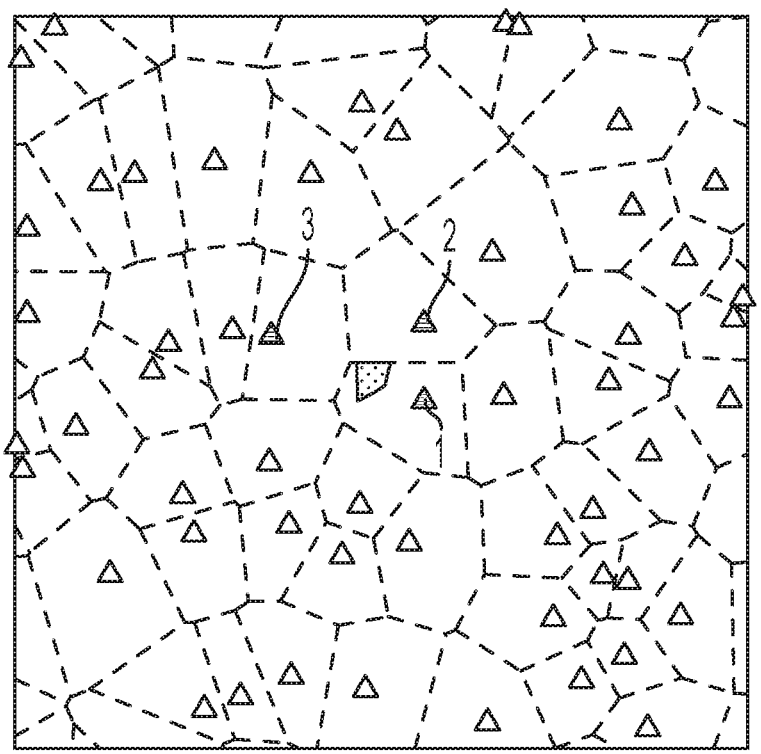
FIG. 7 is a first-order tesselation of an area showing access point locations, and an intersection of first throught third-order Voronoi cells for three BSs.
Figure 8:
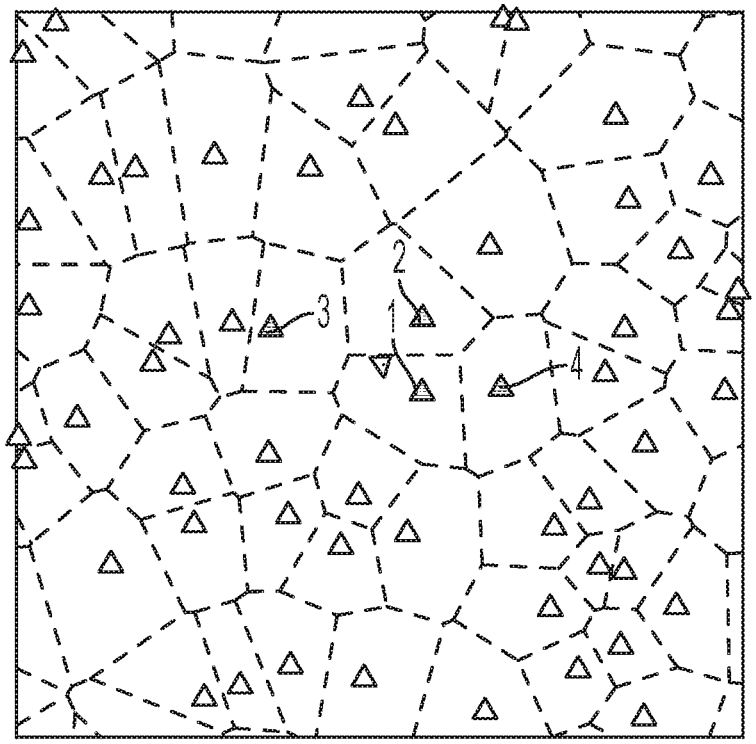
FIG. 8 is a first-order tesselation of an area showing access point locations, and an intersection of first throught third-order Voronoi cells for four BSs.

As shown in FIG. 5, the first-order HLR is used to approximate the first-order Voronoi-cell. Apparently, it contains the location of the agent (i.e., the origin) and only one BS (i.e., the nearest BS). Analogous to the LR, information about the order and locations of the neighboring BSs creates void regions within the HLR, which reduces its area (shown in FIG. 13). Specifically, one can observe that the void region is the set of points that is closer to the farther BS than a nearer BS to the origin.

Since PPP is a random process, the LR (i.e., $V_{x_1}$ and $V_X$) and the HLR (i.e., $H_{x_1}$ and $H_X$) are random sets. Consequently, the area of the HLR is a random variable. We next determine the distribution of the area of first-order HLR.

In the description below, proofs are omitted and the reader is referred to the inventors' publication, Hesham Elsawy, Wenhan Dai, Mohamed-Slim Alouini, and Moe Z. Win. "Base Station Ordering for Emergency Call Localization in Ultra-dense Cellular Networks," *IEEE Access* 6 (Oct. 4, 2017): 301-315, which is incorporated herein by reference.

Lemma 1 Let $\lambda$ BS/m² be the intensity of $\Psi$. Then the Lebesgue measure of the first-order HLR, denoted as $L(H_{x_1})$, has an exponential distribution with mean $\lambda^{-1}$ m².

In addition to being tractable, the HLR has the following desirable characteristics:

Similarly to $V_{x_1}$, the first-order HLR $H_{x_1}$ contains the agent's location and the nearest BS to the agent.

The HLR does not contain any other BS.

The average area of the first-order HLR is equal to the average area of the typical first-order LR, i.e., $\mathbb{E}\{L(H_{x_1})\} = \mathbb{E}\{L(V_{x_1})\} = 1/\lambda$.

The average area of the first-order HLR is not affected by Palm conditioning $\mathbb{E}\{L(H_{x_1})\} = \mathbb{E}\{L(H_{x_1}|o=\{0,0\})\}$.

It is important to emphasize that the proposed BoLT does not utilize the HLR to localize the agent. The concept of the HLR is introduced to analyze the performance of BoLT, as the HLR has many similarities to the LR and the area of the HLR is much more tractable.

We next outline the method to analyze the area of the HLR. For an arbitrary realization $\mathcal{L}$, consider the second-order HLRs $\mathcal{H}_{\{x_n,x_m\}}$ and let $\mathcal{H}_X$ denote the void regions in $\mathcal{H}_{x_1}$ when reporting BSs in X, i.e., $$\mathcal{H}_X = \mathcal{H}_{x_1} \setminus \mathcal{H}_X.$$

Figure 9:
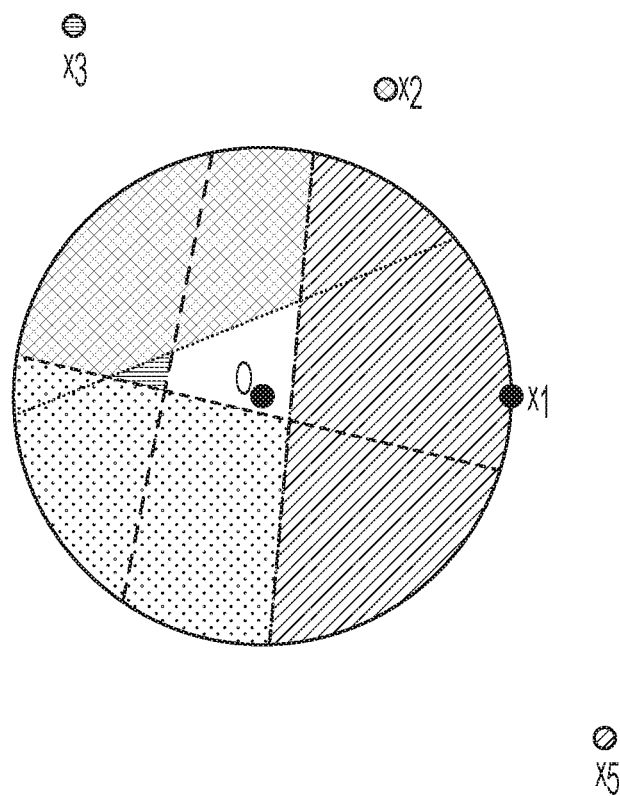
FIG. 9 is an illustration of a total void region $\mathcal{H}_{x_5} = \cup_{i=1}^{4} \mathcal{H}_{\{x_i, x_{i+1}\}}$ and the corresponding HLR as the unshaded region around the origin used in analysis.

Examples of different second-order (also denoted as pairwise) void regions are shown as colored segments in FIG. 9. Combining all pairwise void regions, the overall void region associated with (m+1) BSs is given by $$\overline{\mathcal{H}}_{X_m} = \bigcup_{i=1}^{m} \overline{\mathcal{H}}_{\{x_i, x_{i+1}\}}. \tag{1}$$

The HLR is then given by $$\mathcal{H}_{X_m} = \mathcal{H}_{x_1} \setminus \overline{\mathcal{H}}_{X_m}. \tag{2}$$

Note that $\mathcal{H}_{X_m}$ uses the order of m+1 BSs to approximate $\mathcal{V}_{X_m}$ where m BSs are reported. This is a tighter approximation compared to $\mathcal{H}_{X_{m-1}}$ as $\mathcal{V}_{X_m}$ exploits the knowledge that every BS outside $X_m$ is farther-way from the agent than those inside $X_m$. More details about this approximation are given in the sequel.

Figure 13:
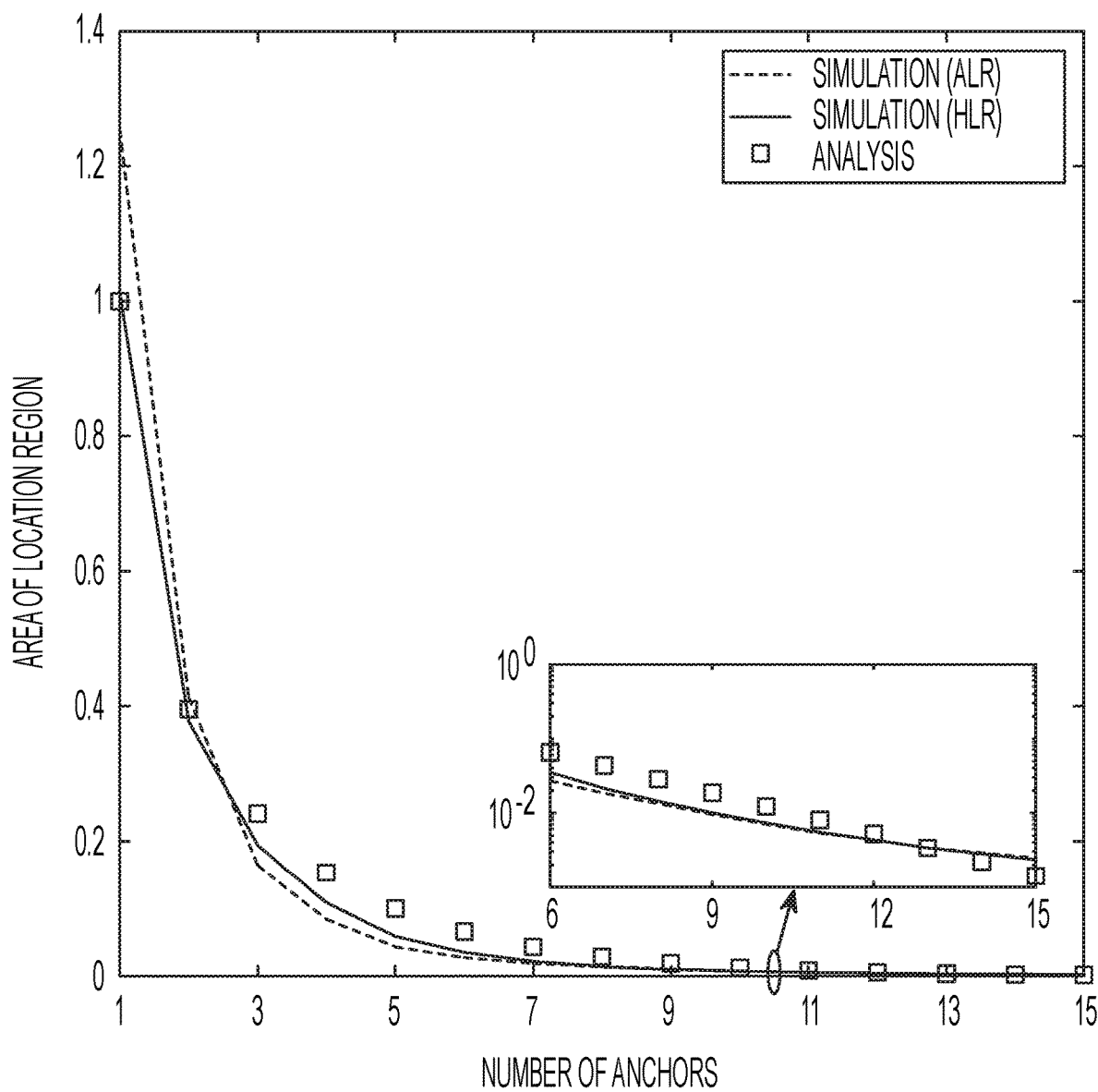
FIG. 13 is a plot of localization accuracy versus the number of reported anchors.

FIG. 9 shows an example for the involved void region and the HLR when reporting four anchors. FIGS. 4-9 show the methodology to approximate the LR via the HLR. The first-order Voronoi cell is approximated via the circular first-order HLR. The intersection $\delta_{x_1} \cap \mathcal{V}_{X_2}$ is approximated via $\mathcal{H}_{X_2}$, which, according to (1) and (2), is obtained by eliminating the void regions $\mathcal{H}_{\{x_1,x_2\}} \cup \mathcal{H}_{\{x_2,x_3\}}$ from $\mathcal{H}_{x_1}$. By construction, $\mathcal{V}_{x_1} \cap \mathcal{V}_{x_2}$ implies that the agent is within $\mathcal{V}_{x_1}$ and is closer to the locations $X_2=\{x_1, x_2\}$ than any other location within $\mathcal{L} \setminus X_2$. The approximation $\mathcal{H}_{X_2}$ implies that the agent is in $\mathcal{H}_{x_1}$ and is closer to $X_2$ than $x_3$ only. Hence, in addition to approximating $\delta_{x_1}$ with $\mathcal{H}_{x_1}$, the set $\mathcal{H}_{X_2}$ ignores the effect of the other points $\mathcal{L} \setminus \{X_3\}$ on the LR. Following the same analogy, the intersection $\cap_{i=1}^{m} \mathcal{V}_{X_m}$ is approximated via $\mathcal{H}_{X_m}$, which ignores the effect of $\mathcal{L} \setminus \{X_{m+1}\}$ on the LR, nevertheless, it gives a decent approximation to the ALR as shown in FIG. 13.

Following the aforementioned approach, the analysis starts in Section 4.1 by calculating the conditional Lebesgue measures of the pairwise void regions L ($\mathcal{H}_{\{x_n,x_m\}}$) as well as the pairwise decay ratios $$\zeta_{n,m} = \frac{L(\overline{\mathcal{H}}_{\{x_n,x_m\}})}{L(\mathcal{H}_{x_1})}.$$

In particular, we derive the expression of $\zeta_{n,m}$ as a function of the relative and absolute distances between anchors and the agent. In Section 4.2, we obtain the distributions of the relative and absolute distances between anchors and the agent. The obtained distances distributions are utilized in Section 4.3 to find the average area of the pairwise HLRs, i.e., $\mathbb{E}\{L(\mathcal{H}_{\{x_n,x_m\}})\}$, as well as the average value of $\zeta_{n,m}$. As shown in FIG. 9, and utilizing (1) and (2), the pairwise HLRs can be used to compute the total void region $\mathbb{E}\{L(\mathcal{H}_{X_m})\}$ when reporting m anchors. However, the area of overlaps between such pairwise void regions are hard to compute, which necessitates an approximation for total void region $\mathbb{E}\{L(\mathcal{H}_{X_m})\}$. An approximate expression for $\mathbb{E}\{L(H_{X_m})\}$ is then obtained, in Section 4.3, by getting the Lebesgue measure of the complement of the total void region. Finally, the localization error probability due to shadowing is presented in Section 5.

4 Location Accuracy

This section characterizes the localization accuracy through the spatially averaged area of the HLR.

4.1 Conditional Analysis

This subsection focuses on a certain realization of $H_{x_1} \doteq \mathcal{H}_{x_1}$ and $\Psi \doteq \mathcal{L}$. Let $$\delta(x, y, \alpha) = \arccos\left(\frac{x(y^2 - 1)}{2\sqrt{1 + y^2 - 2y\cos(\alpha)}}\right),$$

and $w_{j,k}=r_k/r_j$, where $r_j$ and $r_k$ denote the distance between the jth and the kth nearest BSs to the agent. The following lemma characterizes the void region L ($\mathcal{H}_{\{x_n,x_m\}}$).

Lemma 2 The Lebesgue measure of the void region when considering the order between $x_n$ and $x_m$ is given by $$L(\overline{\mathcal{H}}_{\{x_n,x_m\}}) = \frac{r_1^2}{2}\begin{cases} 2\delta(1, w_{1,n}, \alpha) - \sin(2\delta(1, w_{1,n}, \alpha)), & n = 1 \\ 2\delta(w_{1,n}, w_{n,m}, \alpha) - \sin(2\delta(w_{1,n}, w_{n,m}, \alpha)), & n > 1 \end{cases} \tag{3}$$

provided that $1<w_{1,n}<2$, $1<w_{n,m}<1+w_{1,n}$, and $$\arccos\left(\frac{6w_{1,n}^2 + 3 - w_{1,n}^4}{8w_{1,n}}\right) \leq \alpha \leq \pi$$

where α denote the angle between the two BSs measured at the agent. If these conditions do not hold, $L(\mathcal{H}_{\{x_n,x_n\}})=0$.

Recall that $\zeta_{n,m}$ denotes the percentage reduction in L ($\mathcal{H}_{x_1}$) when considering $x_n$ and $x_m$. If the conditions in Lemma 2 hold, then $$\zeta_{n,m} = \frac{L(\overline{\mathcal{H}}_{\{x_1,x_n\}})}{L(\mathcal{H}_{x_1})} \tag{4}$$

$$= \frac{L(\overline{\mathcal{H}}_{\{x_1,x_n\}})}{\pi r_1^2}$$

$$= \frac{1}{2\pi}\begin{cases} 2\delta(1, w_{1,n}, \alpha) - \sin(2\delta(1, w_{1,n}, \alpha)), & n = 1 \\ 2\delta(w_{1,n}, w_{n,m}, \alpha) - \sin(2\delta(w_{1,n}, w_{n,m}, \alpha)), & n > 1 \end{cases}$$

Figure 10:
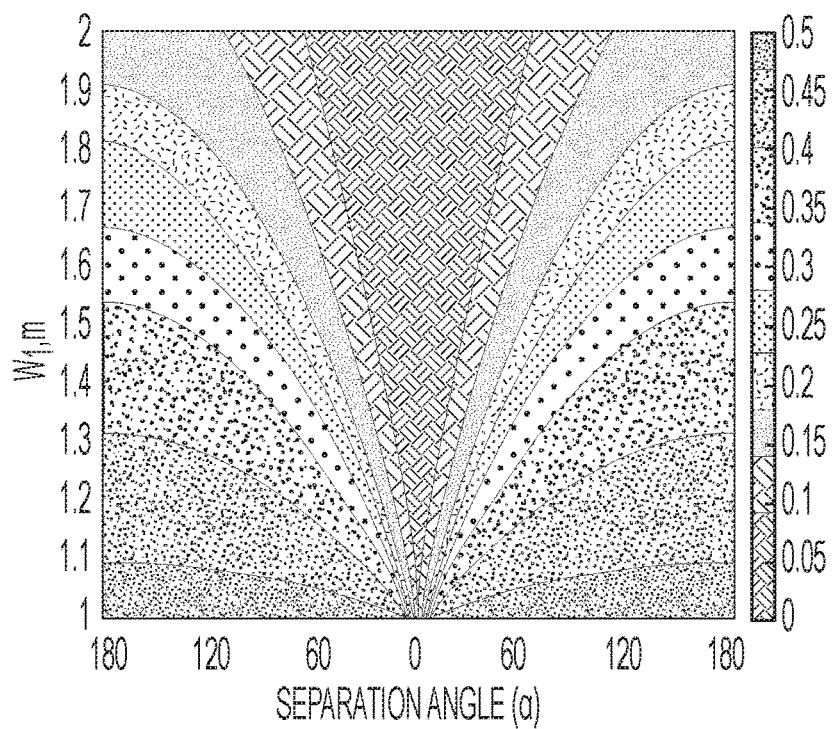
FIG. 10 is a heat plot showing pairwise percentage reduction with respect to nearest two anchor.
Figure 11:
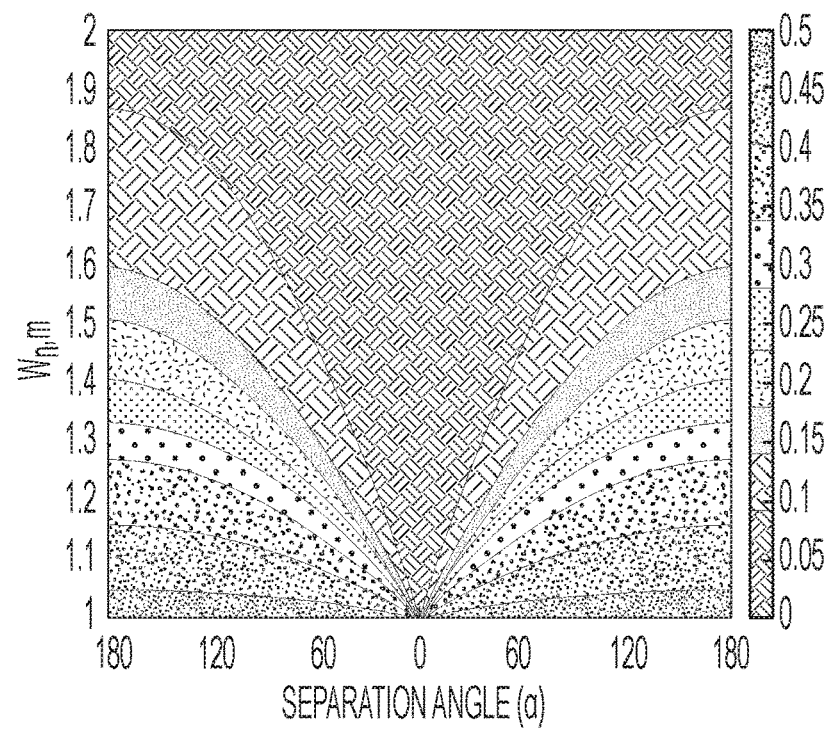
FIG. 11 is a heat plot showing pairwise percentage reduction with respect to the $n^{th}$ and $m^{th}$ anchors for $w_{1,n}=2$.
Figure 12:
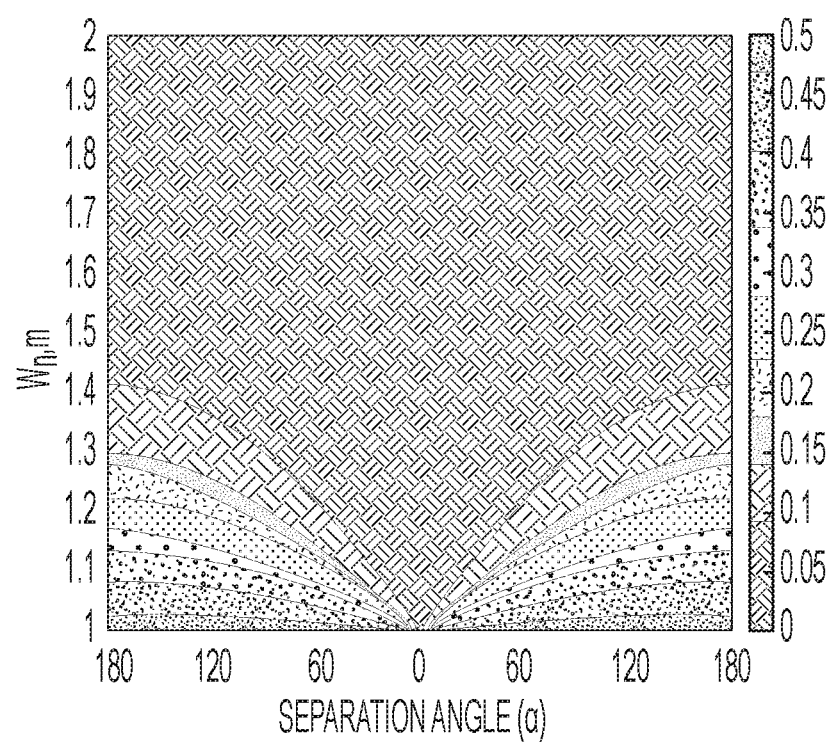
FIG. 12 is a heat plot showing pairwise percentage reduction with respect to the $n^{th}$ and $m^{th}$ anchors anchor for $w_{1,n}=4$.

Equation (4) shows that the percentage reductions in the HLR does not rely on the absolute distances between the anchors and the agent, but is rather dependent on the relative distances between the anchors and the agent as well as the separation angle from the agent to anchors. Furthermore, (3) and (4) show that there is a certain range of relative distances and separation angels that will reduce the HLR. Otherwise, the knowledge of order is of no benefit in reducing the HLR. The fact that more percentage reduction in the HLR is achieved when the relative distances $w_{n,m}$ decreases and/or the relative angle α increases are depicted in FIGS. 10-12. The figure shows that the maximum reduction for reporting the order of an additional BS is bounded within the range [0, 0.5]. This is because at most the void region can be half of the HLR when the two anchors are almost at the same distance from the agent and are on the opposite sides of the agent (i.e., $\alpha=\pi$). The percentage reduction in the HLR reaches zero when the perpendicular bisector between the line connecting the two anchors is outside the $\mathcal{B}(o, r_1)$.

4.2 Distance Distributions

The focus of this section is to calculate the joint distributions for the absolute and relative distances from the agent to the anchors. Such distances are required to calculate the average Lebesgue measures and the percentage reductions in the HLR. We start by characterizing the joint absolute distance distribution in the following lemma.

Lemma 3 The distances between the agent and the mth and nth BSs, where m>n, has the following joint PDF $$f_{r_n,r_m}(x, y) = \frac{4(\pi\lambda)^m x^{2n-1} y(y^2 - x^2)^{m-n-1} e^{-\pi\lambda y^2}}{\Gamma(n)\Gamma(m-n)} \quad (5)$$

if $0<x<y<\infty$; otherwise, $f_{r_n,r_m}(x, y)=0$.

Using the joint distance distribution in Lemma 1, the relative distance distribution is characterized in the following lemma Lemma 4 The relative distance $w_{n,m}$, where m>n has the following PDF $$f_{w_{n,m}}(w) = \frac{2w^{1-2m}(w^2 - 1)^{m-n-1}}{\mathcal{B}(n, m-n)}$$

if $1<w<\infty$; otherwise, $f_{w_{n,m}}(w)$.

Two special cases of interest for the relative distance distributions are given in the following corollary.

Corollary 1 For n=m−1, the PDF of the relative distance $$w_{n,m} = \frac{r_m}{r_n}$$

is $$f_{w_{m-1,m}}(w)=2(m-1)w^{1-2m}$$

if $1<w<\infty$; otherwise, $f_{w_{m-1,m}}(w)=0$. For n=1 and any m, the relative distance distribution reduces to $$f_{w_{1,m}}(w)=2(m-1)w^{1-2m}(w^2-1)^{m-2} \quad (6)$$

if $1<w<\infty$; otherwise, $f_{w_{1,m}}(w)=0$.

The joint distribution between $w_{1,m}$ and $r_1$ is given in the following corollary Corollary 2 The joint distribution of $w_{1,m}$ and $r_1$ is given by $$f_{w_{1,m},r_1}(w, r) = \frac{4(\pi\lambda)^m r^{2m-1} w(w^2 - 1)^{m-2} e^{-\pi\lambda(rw)^2}}{\Gamma(m-1)} \quad (7)$$

if $0<r<\infty$ and $1<w<\infty$; otherwise, $f_{w_{1,m},r_1}(w,r)=0$.

The joint relative distance distribution is characterized in the following lemma.

Lemma 5 The relative distances $w_{1,n}$ and $w_{n,m}$, where $1<n<m$, are independent.

Lemma 5 implies that the joint distribution of $w_{1,n}$ and $w_{n,m}$ is given by $f_{w_{1,n},w_{n,m}}(w,v)=f_{w_{1,n}}(w)f_{w_{n,m}}(v)$, which can be obtained from Lemma 4.

The joint relative distance distribution and $r_1$ is characterized in the following corollary.

Corollary 3 The relative distances $w_{1,n}$, $w_{n,m}$ and the distance $r_1$, where $1<n<m$, have the following joint PDF $$f_{w_{1,n},w_{n,m},r_1}(w, \upsilon, r) = \quad (8)$$

$$\frac{8(\pi\lambda)^m r^{2m-1} w^{2m-2n+1} \upsilon}{\Gamma(n-1)\Gamma(m-n)} \cdot (w^2 - 1)^{n-2}(\upsilon^2 - 1)^{m-n-1} e^{-\pi\lambda(w\upsilon r)^2}$$

provided that $0<r<\infty$, $1<\upsilon<\infty$ and $1<w<\infty$; otherwise, $f_{w_{1,n},w_{n,m},r_1}(w, v, r)=0$.

4.3 Average Performance of BoLT

For the sake of notational connivence, we introduce the function $\rho(\cdot)$ and it is defined over the integer set $\{2, 3, \ldots\}$, where $$\kappa(\omega) = \arccos\left(\frac{6w^2 + 3 - w^4}{8w}\right) \text{ and } \kappa(y, \alpha) = \frac{2\sqrt{1 + y^2 - 2y\cos(\alpha)}}{(y^2 - 1)}.$$

We next evaluate the average Lebesgue measure of the pairwise void regions as follows $$\mathbb{E}\{L(\overline{H}_{\{x_{m-1},x_m\}})\} = \frac{\rho(m)}{\lambda} \quad (9)$$

which is obtained by averaging (3) over the uniform angle distribution in the range of $[0, \pi]$ along with the joint distribution in (8). Utilizing the spatially average void regions, the area of HLR is characterized in the following proposition.

Proposition 1 The average area of the m-order HLR is given by $$\mathbb{E}\{L(H_{X_m})\} = \frac{1}{\lambda}(1 - T(m)) \quad (10)$$

where T(m) is the normalized Lebesgue measure of the total void region when reporting the order of m anchors, which is given via the following recursive equation.

$$T(m) = \quad (11)$$

$$\begin{cases} 0, & m = 1 \\ \rho(2) + \rho(3) - \lambda\mathbb{E}\{L(\overline{H}_{\{x_1,x_2\}} \cap \overline{H}_{\{x_2,x_3\}})\}, & m = 2 \\ T(m-1) + \rho(m+1) - \lambda\mathbb{E}\{L(\overline{H}_{X_{m-1}} \cap \overline{H}_{\{x_m,x_{m+1}\}})\}, & m \geq 3 \end{cases}.$$

Moreover, we have the following approximation $$\lambda\mathbb{E}\{L(\mathcal{H}_{\{x_1,x_2\}} \cap \mathcal{H}_{\{x_2,x_3\}})\} \approx O(\rho(2),\rho(3))$$

$$\lambda\mathbb{E}\{L(\mathcal{H}_{X_{i-1}} \cap \mathcal{H}_{\{x_i,x_{i+1}\}})\} \approx O(T(i-1),\rho(i+1))$$

where the expression for O(x, y) is given by $$O(x, y) = \qquad (12)$$
$$(\min\{x, y\} - [x + y - 1]^+)^3/3 +$$
$$\frac{(1 - (x+y))(\min\{x, y\} - [x + y - 1]^+)^2/2}{(1-x)(1-y)} + \frac{|x-y|}{1-\min\{x,y\}}\min\{x, y\}$$

It can be verified that $$\mathbb{E}\{L(\overline{\mathcal{H}}_{\chi_{m-1}} \cap \overline{\mathcal{H}}_{\{x_m, x_{m+1}\}})\} \propto \frac{1}{\lambda},$$

which shows that T(m), given in (11), does not rely on the anchors' density and only depends on the number of reported anchors. Hence, the Lebesgue measure of HLR given in (10) is approximately linear in $$\frac{1}{\lambda}.$$

This leads to the following two hypotheses.
  For any number of reported BSs, the Lebesgue measure of the ALR can be inverse-linearly decreased by increasing λ.
  The normalized ALR area reduction due to reporting more BSs is irrelevant to the BS density.

While both hypotheses are verified in Section 6, the second hypothesis can also be verified by explicitly evaluating the normalized HLR area reduction, which is given by $$\mathbb{E}\{\zeta_{1,2}\} = \int_1^2 \int_{\kappa(w)}^\pi \frac{2\delta(1, w, \alpha) - \sin(2\delta(1, w, \alpha))}{w^3 \pi^2} d\alpha dw \text{ and} \qquad (13)$$

$$\mathbb{E}\{\zeta_{m-1,m}\} = \int_1^2 \int_0^\pi \int_1^{\kappa(y,\alpha)} \frac{4(n-2)(n-1)(x^2-1)^{n-3}}{x^{2m-5}y^{2m-1}\pi^2} [2\delta(x, y, \alpha) - \qquad (14)$$
$$\sin(2\delta(x, y, \alpha))]dxd\alpha dy.$$

5 Localization Error Probability

This section evaluates the localization error probability due to the shadowing effects.

If the pilots' power order received at the agent does not match the true order of the BSs, then BoLT will report an LR that does not contain the agent location. This event can occur if the shadowing is strong enough to attenuate the pilot power received from a closer BS below that from a farther BS. Let $p_{m-1,m}$ denote the probability that the shadowing does not alter the received power levels from any two consecutive BSs at the agent, which is given by $$p_{m-1,m} = \mathbb{P}\{h_{m-1}r_{m-1}^{-\eta} > h_m r_m^{-\eta}\} \qquad (15)$$
$$= \mathbb{P}\{h_{m-1,m} < w_{m-1,m}^\eta\}$$
$$= 1 - \int_1^\infty (m-1)w^{1-2m} \text{erfc}\left(\frac{\eta \ln(w)}{2\sigma}\right) dw$$
$$= \frac{1}{2} - \frac{\exp\left(\frac{4\sigma^2(m-1)^2}{\eta^2}\right)\left(\text{erfc}\left(2\sigma\frac{(1-m)}{\eta}\right) - 2\right)}{2}$$

where the third equality follows from the distribution of $w_{n,m}$ given in Lemma 4 and the fact that $$h_{m,n} = \frac{h_n}{h_m} \sim L\mathcal{N}(0, 2\sigma^2).$$

The localization error probability, when reporting m BSs, can be approximated as $$\varepsilon(m) = 1 - \prod_{i=2}^m p_{i-1,i} \qquad (16)$$
$$= 1 - \prod_{i=2}^m \left(\frac{1}{2} - \frac{\exp\left(\frac{4\sigma^2(m-1)^2}{\eta^2}\right)\left(\text{erfc}\left(2\sigma\frac{(1-m)}{\eta}\right) - 2\right)}{2}\right)$$

where the approximation is that the events $\{h_{m-1}r_{m-1}^{-\eta} > h_m r_m^{-\eta}\}$ are independent for different m.

As shown in (16), the approximated localization error probability is irrelevant to the BS density λ. Instead, it is a function of the number of reported BSs, the propagation model (e.g., path-loss exponent), and the variance of the shadowing.

6 Numerical Results

This section evaluates the average area of the HLR that is obtained via the analytical model presented in Proposition 1 as well as the localization error probability given by equation (16). To verify the analysis, we conduct a Monte Carlo simulation that assesses the performance of BoLT in terms of the ALR, HLR, and localization error probability.

In each simulation run, we realize a PPP with intensity λ=1 in a 100 km² area. We then order the BSs with respect to the origin and compute the ALR corresponding to m BSs, where m=1, 2, 3, 4, . . . , 15. For the localization error probability, we assume that all BSs transmit with the same power of P=1 Watt and the path-loss exponent is selected to be η=4. In each realization of the PPP, we generate independent and identically distributed channel gains for the nearest m BSs according to the log-normal distribution. The event of error is recorded if the order of the BSs power received at the origin is different from BSs order according to their Euclidean distance.

FIG. 13 shows the ALR and the area of the HLR as functions of the number of reported anchors. The figure also shows the approximated HLR obtained via Proposition 1. The figure validates the accuracy of the proposed HLR to approximate for the ALR. Note that the ALR is greater than the area of the HLR at m=1 due to the palm conditioning effect on containing the origin. Since the test Voronoi cell is conditioned to contain the agent (i.e., the origin), it is implied that the average area of the Voronoi is larger than that of the unconditioned one. This concept is known in the literature as the Crofton cell or the 0-cell. For all values of m>2, the area of the HLR almost matches the ALR. The figure also shows a desirable match between the analytical result obtained via Proposition 1 and the area of the HLR obtained via simulations for the range 1≤m≤15. Note that the match is not exact due to the adopted approximation for the overlap between the void regions. The figure also shows that, on average, using the order of six BSs leads to ALR no greater than 10% of the BS coverage area. Increasing the number of reported anchors to 10 leads to an ALR no greater than 1% of the BS coverage area. Exceeding 15 BSs can lead to ALR no greater than 0.1% of the BS coverage area.

Figure 14:
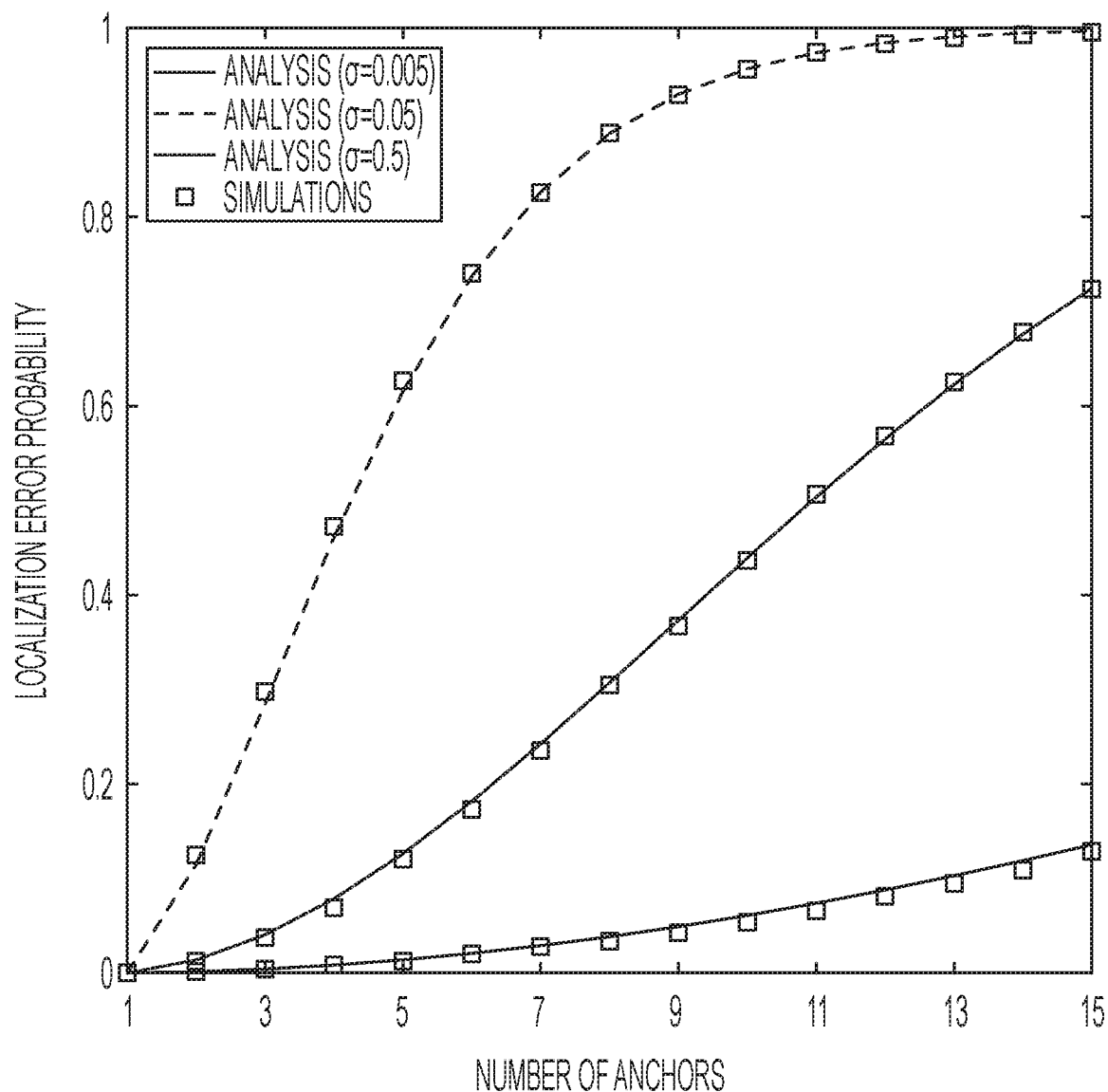
FIG. 14 is a plot of localization error probability versus the number of reported anchors.

FIG. 14 shows the localization error probability as a function of the number of reported BSs. The matching between the simulation and analytical model validates the tight approximation in (16).

FIG. 14 shows that increasing the number of BSs increases the vulnerability of BoLT to false ordering. Moreover, increasing the variance of shadowing also makes BoLT more vulnerable to false ordering.

Jointly considering FIGS. 13 and 14 manifests the tradeoff between the localization accuracy (i.e., the ALR) and the probability of localization error. Increasing the number of reported BSs decreases the ALR, and hence, increases the location accuracy. However, such increased localization accuracy comes at the expense of higher probability of localization error.

Figure 15:
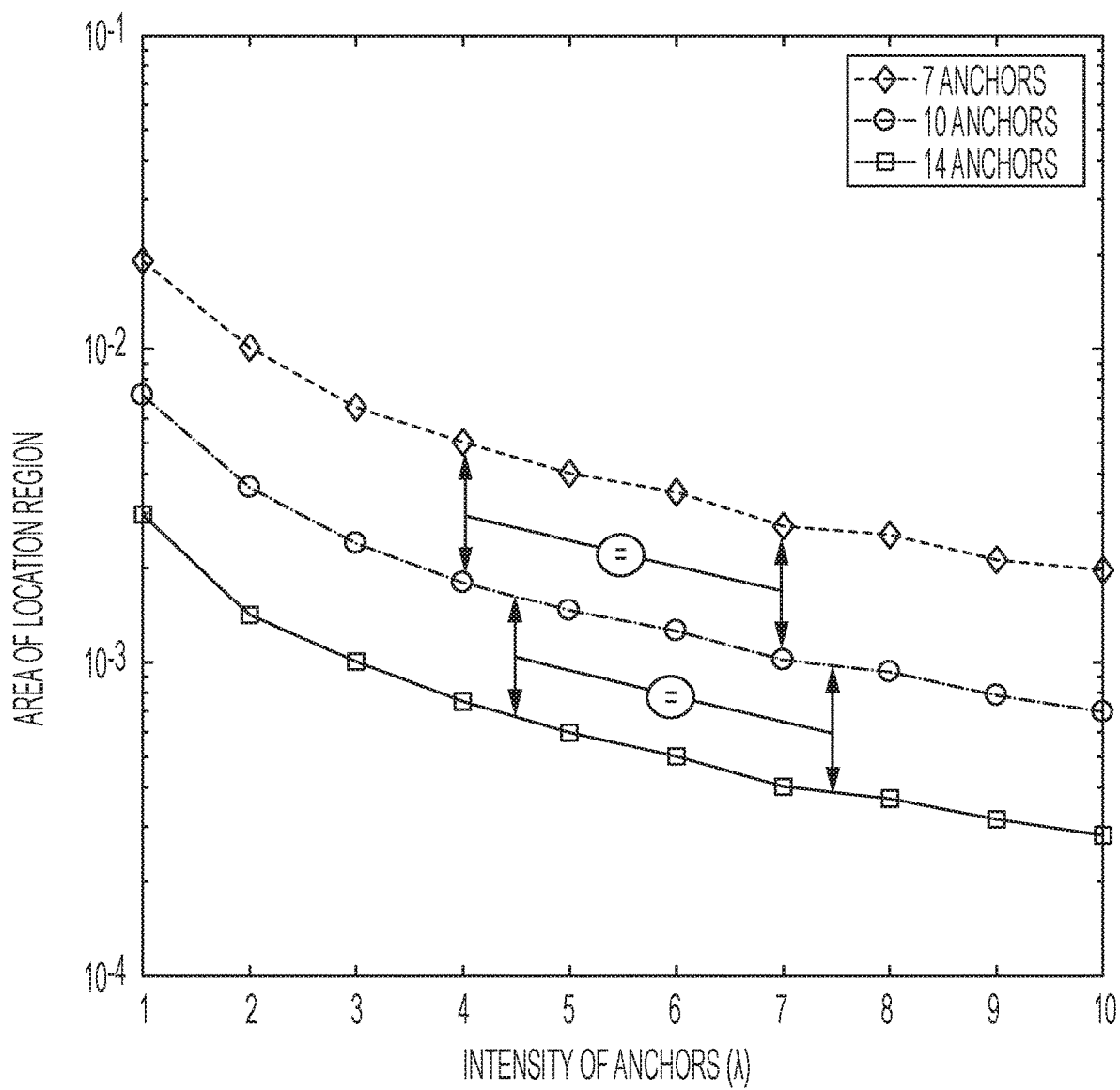
FIG. 15 is a plot of localization accuracy versus the intensity of anchors.

FIG. 15 shows the ALR obtained via simulations as a function of the intensity of anchors. The figure shows inverse-linear relationship between the ALR and the intensity of anchors, which validates the first hypothesis given in Section 4.3. The figure also shows that the reduction in the ALR achieved by increasing the number of reported anchors is independent of the anchors intensity, which validates the second hypothesis given in Section 4.3. Consequently, FIG. 15 validates the insights obtained from the approximate analytical model presented in Proposition 1. In conclusion, the localization accuracy of BoLT can be improved through two independent operations, namely, densification (i.e., increasing λ) and increasing the number of reported anchors within the NCL. The densification approach is more desirable as it does not affect the localization error portability.

7 Alternatives and Implementations

The approaches described above are not limited to radio-frequency cellular telephone systems. A variety of wide-area and local-area wireless networking approaches can make use of the described approaches. As introduced above, the techniques are not limited to radio communication, and may make use of other communication techniques such as ultrasound or optical communication. Furthermore, the determination of the ordered list of anchors is not limited to using relative power. For example, relative time-of-arrival may be used. As another example, the relative angles of arrival at an antenna array at the mobile device may be used to infer distance or relative distince from a transmitter. Furthermore, the transmissions that are used to determine the relative distances do not have to propagate from the anchors to the mobile devices. As an illustrative alternative example, a mobile device may emit an ultrasound signal that is received and timestamped at multiple anchors, and these timestamped arrival times are collected to form the ordered list of closest anchors to the mobile device. Furthermore, in at least some implementations described above, the determination of location is performed in the infrasture of the communication system, but the determination may be performed at the mobile device if some or a required part of the database is distributed to the mobile device. For example, only that part of the database that is relevant to the mobile device's general location is required to be resident at the mobile device for it to perform localization.

The general approach to mapping the ordered set of anchors to the agent's location region can be adapted without deviating from the advantages described above. For example, in situations in which an ordered list is not consistent with any true location region, for example, due to errors in determing the order based on shadowing or other phenomena that affect received signal strength, an error correction approach may be used to correct the order to yeild a possible location. Similarly, if no true location is consistent with a full ordered set of anchors, the longest truncated list that does yield a true location may be used.

It should also be understood that the analytical and modeling techniques (e.g., for shadowing effects on power or the spatial point process for anchor distribution) described above are not the only way to estimate performance metrics. For example, error rates and average localization areas may be estimated using Monte Carlo or systematic sampling to locations and determined anchor orders may be used to yield results that do not require as many modeling assumptions. Furthermore, the performance measures or optimal length of the anchor list may be region dependent, for example, in situations in which the distribution of the anchor locations is not homogeneous or well characterized by a stochastic process. Furthermore, real-world surveys of received signal strength maybe used to infer the anchor locations (and their transmission powers), and to build a database of ordered tuples associated with localization regions, which may be distributed to the mobile devices. One advantage of such an approach over power-level-based fingerprint approaches to localization may be that a more compact database may be used and/or that a more robust localization result is provided.

Is should also be recognized that the databases described above may be implemented using a variety of data structures. For example, the tuple of anchor identifiers may used as a key, which is indexed with conventional database techniques to permit efficient retrieval of corresponding records. Alternatively, a data structure such as a hash table may be used. Yet another alternative is to use a tree-stucture that is traversed in the order of the anchors, with higher-order Voronoi cell information being linked to nodes in the tree corresponding to the anchors in the path from the root to that node. In this way, the multiple tables illustrated in FIG. 3 can be implemented in a single tree structure.

Figure 16:
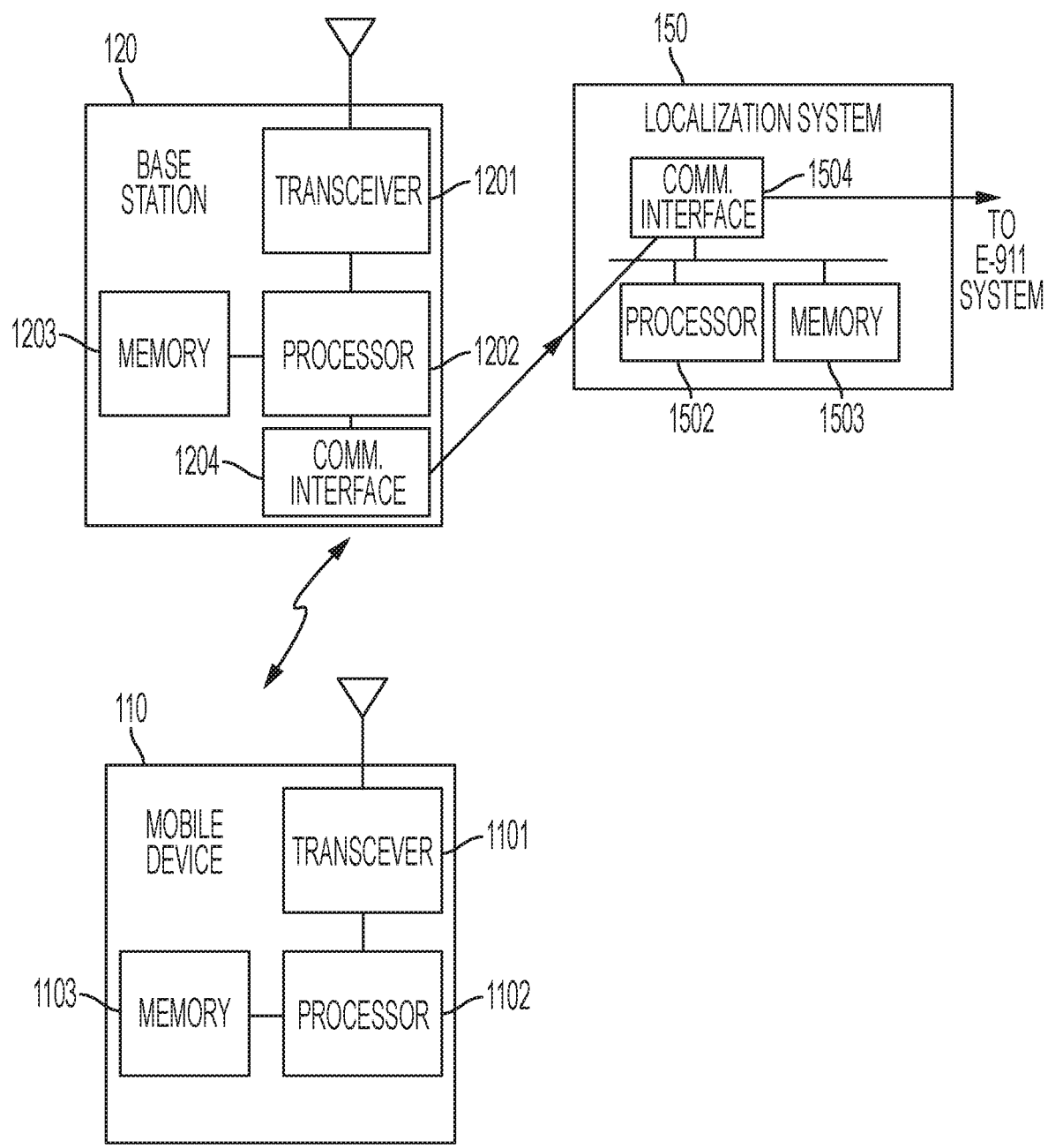
FIG. 16 is a block diagram of an implementation.

Referring to FIG. 16, both the base stations (e.g., a representative base station 120 shown) and the mobile devices (e.g., a representative mobile device 110 shown) have transceivers 1201, 1101, respectively, for radio communication between the mobile device and the base stations. In at least some implementations, the mobile devices and base stations are software controlled, and include processors 1202, 1102, and memory 1203, 1103, which may provide non-transitory storage of instructions for execution on the processors. In addition, the base station includes a communication interface 1204 for communicating with the localization system runtime 150, which is generally accessible to all of the base stations. It should be understood that the function of the localization system runtime 150 may be hosted in various parts of a cellular system, including at or within base station controllers (BSCs), mobile switching centers (MSCs), and the like, or may be hosted in network communication with such devices. In some implementations, localization system 150 includes a processor 1502 and memory 1503, as well as a communication interface 1504 for communicating with base stations, as well as with external systems, such as an E-911 system, which receive the determined localization information. It should be understood that some or all of the functions described may be implemented in hardware (e.g., application-specific integrated circuits (ASICs)), or in a combination of hardware and software.

One or more embodiments described in this document are within the scope of the appended claims.

What is claimed is:

1. A method for localization of a mobile device in a communication environment comprising a plurality of fixed-location base stations comprising:
   determining a subset of a number (N) of base stations from the plurality of base stations, representing a determination of the closest N base stations to the mobile device;
   using the determined subset of base stations to access a database holding an association of a plurality of subsets with respective location information for the environment, wherein using the determined subset of base stations includes retrieving location information corresponding to the subset of base stations from the database in response to providing the determined subset of base stations representing the closest N base stations to the mobile device to the database, and wherein the location information comprises a representation of a localization region of the environment, the localization region comprising a higher-order Voronoi cell or an intersection of higher-order Voronoi cells; and
   providing the retrieved location information as representing a location of the mobile device.

2. The method of claim 1 further comprising: providing data representing at least one of a probability of error in localization and a spatial uncertainty of the location region for the retrieved location region.

3. The method of claim 1 wherein the subset of the base stations comprises an ordered subset that is ordered according to determined distance between the mobile device and the corresponding base station.

4. The method of claim 1 wherein determining the subset of base stations includes determining a characteristic of communication between the mobile device and base stations of the plurality of base station.

5. The method of claim 4 wherein the characteristic of communication is a radio frequency communication characteristic.

6. The method of claim 4 wherein the communication characteristic is an optical frequency or an acoustic communication characteristic.

7. The method of claim 4 wherein the characteristic of communication comprises an indicator of receive signal strength.

8. The method of claim 7 wherein the subset of base stations represents base stations with the greater RSSI than determined for other base stations of the plurality of base station.

9. The method of claim 4 wherein the communication characteristic characterizes propagation time of a signal passing between the mobile device and respective base stations.

10. The method of claim 9 wherein the subset of base stations represents base stations with the smaller propagation time than determined for other base stations of the plurality of base stations.

11. The method of claim 1, wherein determining the subset of the number (N) of base stations from the plurality of base stations, comprises receiving communication from the mobile device representing the closest N base stations to the mobile device.

12. A method for localization of mobile devices in a communication environment comprising a plurality of fixed location base stations comprising:
   determining, for each subset of a plurality of subsets of base stations from the plurality of base stations, a corresponding localization region of the environment, wherein the localization region is determined such that for any location in the localization region, each of the base stations of the subset are closer to the location than other base stations of the plurality of base stations not in said subset;
   storing a database in which each record of a plurality of records associates a respective subset of the base stations with corresponding location information representing the localization region determined for said subset;
   configuring the database for use in determining location information for a mobile device from a determination of the closest N base stations to the mobile device; and
   repeatedly determining location information for mobile devices in the environment, including for each such determining,
   determining a subset of a number (N) of base stations from the plurality of base stations representing a determination of the closest N base stations to the mobile device,
   using the determined subset of base stations to access the database to retrieve location information associated by a record of the database with determined subset of base stations, and
   providing the retrieved location information as representing a location of the mobile device.

13. The method of claim 12 wherein each subset of the base stations comprises an ordered subset, wherein each localization region is further determined such for any location in the localization region, the base stations are ordered in the same order as the ordered subset by distance between said location and the location of the base station.

14. The method of claim 12 wherein the determining of the localization regions for the environment comprises receiving a characterization of locations of the base stations.

15. The method of claim 14 wherein the characterization of the location of the base stations comprises actual locations of said base stations.

16. The method of claim 14 wherein the characterization of the location of the base stations comprises a statistical characterization of a spatial distribution of said locations.

17. The method of claim 12 wherein the determining of the localization regions for the environment comprises receiving a characterization related to determination of the closest N base stations to a mobile device.

18. The method of claim 12 further comprising selecting the number (N) of base stations used in the association of the subsets with corresponding location information according to an anticipated performance measure.

19. The method of claim 12 further comprising determining an expected performance measure for an ensemble of determinations of location information for mobile devices at locations in the environment.

20. The method of claim 19 wherein the expected performance measure comprises a representation of a probability of an actual location of the mobile device being within the determined localization region based on determined subsets of the base stations by the mobile device at said actual location.

21. The method of claim 19 wherein the expected performance measure comprises a measure of the size of the determined localization region, for instance an area of the localization region.

22. The method of claim 18, wherein the selecting of the number (N) of base stations comprises selecting the number according to the expected performance measure resulting from use of that number in determining the location information for mobile devices in the environment.

23. The method of claim 12, wherein at least some of the subsets of base stations having multiple base stations, and at least some base stations being members of multiple of the subsets of base stations.

24. A non-transitory machine-readable medium comprising instructions stored thereon when executed on a processor cause the processor to:
- determine a subset of a number (N) of base stations that represents a determination of the closest N base stations to a mobile device in a communication environment comprising a plurality of fixed location base stations;
- use the determined subset of base stations to access a database holding an association of a plurality of subsets with respective location information for the environment, wherein using the determined subset of base stations includes retrieving location information corresponding to the subset of base stations from the database in response to providing the determined subset of base stations representing the closest N base stations to the mobile device to the database, and wherein the location information comprises a representation of a localization region of the environment, the localization region comprising a higher-order Voronoi cell or an intersection of higher-order Voronoi cells; and
- provide the retrieved location information as representing a location of the mobile device.

* * * * *